United States Patent
Agarwal et al.

(10) Patent No.: US 12,317,081 B2
(45) Date of Patent: May 27, 2025

(54) USING POSITIONING TECHNIQUES TO DETECT FALSE BASE STATIONS

(71) Applicant: QUALCOMM Incorporated, San Diego, CA (US)

(72) Inventors: Ravi Agarwal, San Diego, CA (US); Gavin Bernard Horn, La Jolla, CA (US); Huilin Xu, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 17/084,889

(22) Filed: Oct. 30, 2020

(65) Prior Publication Data

US 2021/0185536 A1 Jun. 17, 2021

Related U.S. Application Data

(60) Provisional application No. 62/949,358, filed on Dec. 17, 2019.

(51) Int. Cl.
*H04W 48/08* (2009.01)
*G01S 5/02* (2010.01)
(Continued)

(52) U.S. Cl.
CPC ........... *H04W 12/122* (2021.01); *G01S 5/021* (2013.01); *G01S 5/0236* (2013.01); *H04W 48/08* (2013.01);
(Continued)

(58) Field of Classification Search
CPC . H04W 12/1202; H04W 64/00; H04W 48/08; H04W 88/02; H04W 48/16; G01S 5/0236; G01S 5/021
See application file for complete search history.

(56) References Cited

U.S. PATENT DOCUMENTS 7,660,588 B2 2/2010 Sheynblat et al.
9,544,798 B1 * 1/2017 Ahmadzadeh ...... H04L 63/1408
(Continued)

FOREIGN PATENT DOCUMENTS

CN 105307119 A 2/2016
CN 107241729 A 10/2017
(Continued)

OTHER PUBLICATIONS

Ericsson: "Clarifications on Solution #4.10", 3GPP TSG SA WG3 (Security) Meeting #87, 3GPP Draft; S3-171589_WAS(S3-171151)_Update_Solution #4.10_Detection, 3rd Generation Partnership Project (3GPP), Mobile Competence Centre; 650, Route Des Lucioles; F-06921 Sophia-Antipolis Cedex; F, vol. SA WG3, No. Ljubljana, Slovenia; May 15, 2017-May 19, 2017, Jun. 5, 2017 (Jun. 5, 2017), 2 Pages, XP051289770, Retrieved from the Internet: URL: http://www.3gpp.org/ftp/tsg_sa/WG3_Security/TSGS3_87_Ljubljana/Docs/ [retrieved on Jun. 5, 2017].
(Continued)

*Primary Examiner* — Muthuswamy G Manoharan
(74) *Attorney, Agent, or Firm* — Thien T. Nguyen

(57) ABSTRACT

Disclosed are techniques for detecting a potential false base station (FBS). In an aspect, a user equipment (UE) or a location server obtains a first location estimate of the UE based on a cellular network-based positioning procedure involving one or more cells, obtains a second location estimate of the UE based on a non-cellular network-based positioning procedure, determines whether or not a difference between the first location estimate and the second location estimate is greater than a distance threshold, and performs a mitigation operation based on the difference being greater than the distance threshold.

30 Claims, 14 Drawing Sheets

(51) Int. Cl.
*H04W 12/12* (2021.01)
*H04W 12/122* (2021.01)
*H04W 48/16* (2009.01)
*H04W 64/00* (2009.01)
*H04W 88/02* (2009.01)

(52) U.S. Cl.
CPC .......... *H04W 48/16* (2013.01); *H04W 64/00* (2013.01); *H04W 88/02* (2013.01)

(56) References Cited

U.S. PATENT DOCUMENTS

| | | | |
|---|---|---|---|
| 9,763,099 B2* | 9/2017 | Lapidous | .............. H04W 12/12 |
| 11,368,846 B2* | 6/2022 | Tsai | .................... H04W 64/003 |
| 2001/0002822 A1 | 6/2001 | Watters et al. | |
| 2018/0351975 A1* | 12/2018 | Briggs | ................ H04W 12/126 |
| 2019/0380043 A1* | 12/2019 | Hassan | ................ G06F 21/554 |

FOREIGN PATENT DOCUMENTS

| | | |
|---|---|---|
| CN | 109275146 A | 1/2019 |
| EP | 2079259 A1 | 7/2009 |
| WO | 2004036240 A2 | 4/2004 |

OTHER PUBLICATIONS

Ericsson, et al., "UE-Assisted Network-based Detection of False Base Station—pCR", 3GPP Draft; S3-173093 (Rev S3-172344) 8.5_5.1_5.2_Annex_PCR_Detecting_False_Base_Station, 3rd Generation Partnership Project (3GPP), Mobile Competence Centre; 650, Route Des Lucioles; F-06921 Sophia, vol. SA WG3, No. Reno; Nov. 27, 2017-Dec. 1, 2017, Nov. 20, 2017 (Nov. 20, 2017), 3 Pages, XP051380354, Retrieved from the Internet: URL: http://www.3gpp.org/ftp/tsg%5Fsa/WG3%5FSecurity/TSGS3%5F89%5FReno/Docs/ [retrieved on Nov. 20, 2017] p. 2.

International Search Report and Written Opinion—PCT/US2020/058546—ISA/EPO—Mar. 2, 2021.

Philips International B.V., et al., "UE&Network-Assisted UE Avoidance and Network Detection of FBS", 3GPP TSG-SA3 Meeting #101-e, 3GPP Draft; S3-203364, 3rd Generation Partnership Project (3GPP), Mobile Competence centre; 650, Route Des Lucioles; F-06921 Sophia-Antipolis Cedex; France, vol. SA WG3, No. e-Meeting; Nov. 9, 2020-Nov. 20, 2020, Nov. 13, 2020 (Nov. 13, 2020), 5 Pages, XP051954257, Retrieved from the Internet: URL: https://ftp.3gpp.org/tsg_sa/WG3_Security/TSGS3_101e/Docs/S3-203364.zip S3-203364.doc [retrieved on Nov. 13, 2020].

Ericsson: "Clarifications on solution #4.10", 3GPP TSG SA WG3 (Security) Meeting #87, S3-171589 Revision of S3-171151, May 15-19, 2017, Ljubljana, Slovenia, Jun. 5, 2017,XP051289770, 2 Pages.

Nokia, et al., "5GFBS: Detecting FBS based on UE Positioning Measurements", 3GPP TSG-SA3 Meeting #100e, 3GPP Draft; S3-202016, 3rd Generation Partnership Project (3GPP), Mobile Competence Centre; 650, Route Des Lucioles; F-06921 Sophia-Antipolis Cedex; France, vol. SA WG3, No. e-meeting; Aug. 17-28, 2020 Aug. 7, 2020 (Aug. 7, 2020), 5 Pages, XP051916538, the whole document.

* cited by examiner

User Plane Protocol Stack

Control Plane Protocol Stack

USING POSITIONING TECHNIQUES TO DETECT FALSE BASE STATIONS

CROSS-REFERENCE TO RELATED APPLICATIONS

The present application for patent claims the benefit of U.S. Provisional Application No. 62/949,358, entitled "USING POSITIONING TECHNIQUES TO DETECT FALSE BASE STATIONS," filed Dec. 17, 2019, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of detecting a potential false base station (FBS) includes obtaining a first location estimate of a user equipment (UE) based on a cellular network-based positioning procedure involving one or more cells; obtaining a second location estimate of the UE based on a non-cellular network-based positioning procedure; determining whether or not a difference between the first location estimate and the second location estimate is greater than a distance threshold; and performing a mitigation operation based on the difference being greater than the distance threshold.

In an aspect, an apparatus for detecting a potential FBS includes a memory, a communication unit, and at least one processor communicatively coupled to the memory and the communication unit, the at least one processor configured to: obtain a first location estimate of a UE based on a cellular network-based positioning procedure involving one or more cells, obtain a second location estimate of the UE based on a non-cellular network-based positioning procedure, determine whether or not a difference between the first location estimate and the second location estimate is greater than a distance threshold, and perform a mitigation operation based on the difference being greater than the distance threshold.

In an aspect, an apparatus for detecting a potential FBS includes means for obtaining a first location estimate of a UE based on a cellular network-based positioning procedure involving one or more cells, means for obtaining a second location estimate of the UE based on a non-cellular network-based positioning procedure, means for determining whether or not a difference between the first location estimate and the second location estimate is greater than a distance threshold, and means for performing a mitigation operation based on the difference being greater than the distance threshold.

In an aspect, a non-transitory computer-readable medium storing computer-executable instructions for detecting a potential FBS includes computer-executable instructions comprising at least one instruction for obtaining a first location estimate of a UE based on a cellular network-based positioning procedure involving one or more cells, at least one instruction for obtaining a second location estimate of the UE based on a non-cellular network-based positioning procedure, at least one instruction for determining whether or not a difference between the first location estimate and the second location estimate is greater than a distance threshold, and at least one instruction for performing a mitigation operation based on the difference being greater than the distance threshold.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
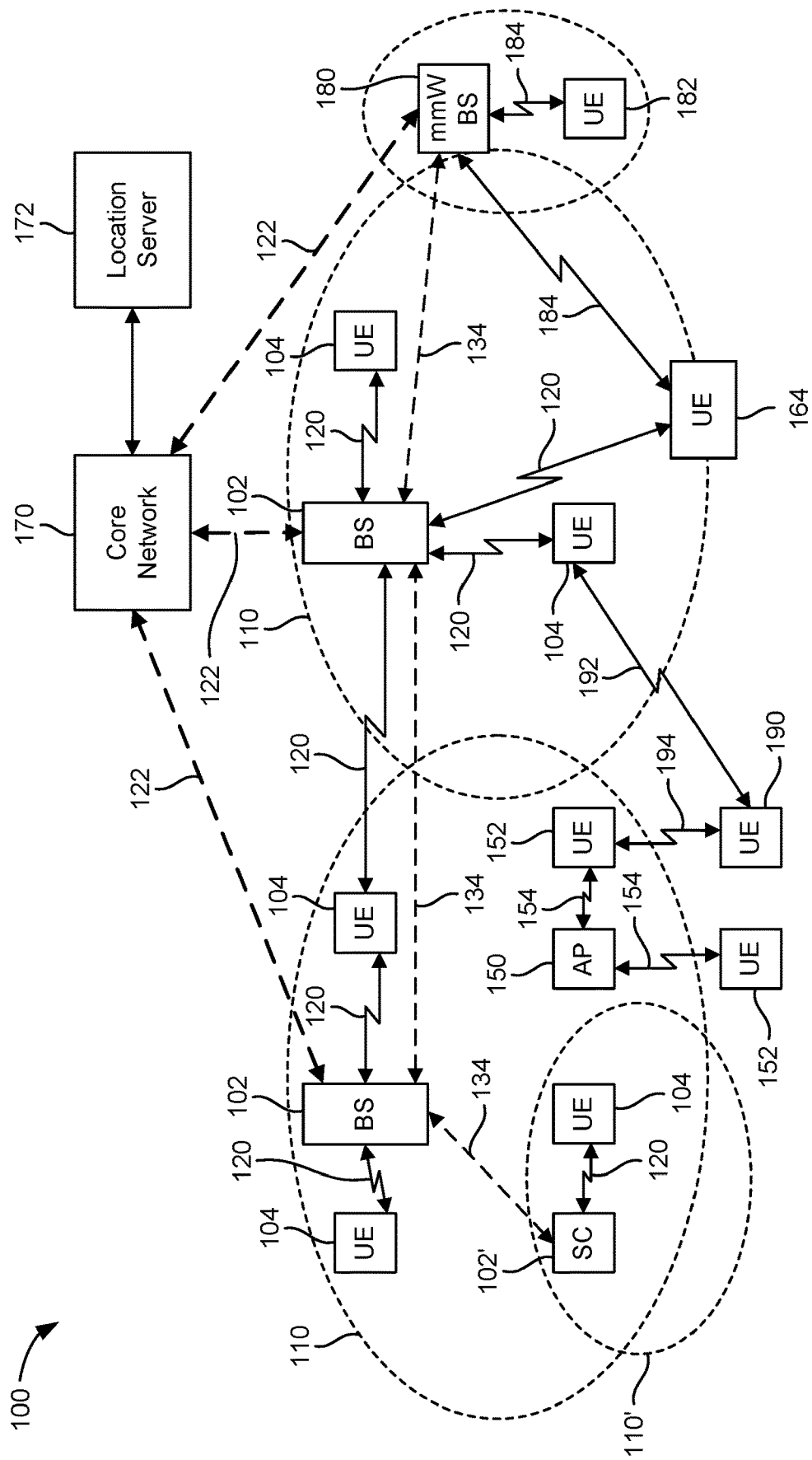
FIG. 1 illustrates an example wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS in LTE and 5G, TRS, PTRS, CRS, CSI-RS, DMRS, PSS, SSS, SSB, SRS, UL-PRS, etc. In addition, the terms "positioning reference signal" and "PRS" refer to downlink or uplink positioning reference signals, unless otherwise indicated. A downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Further note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
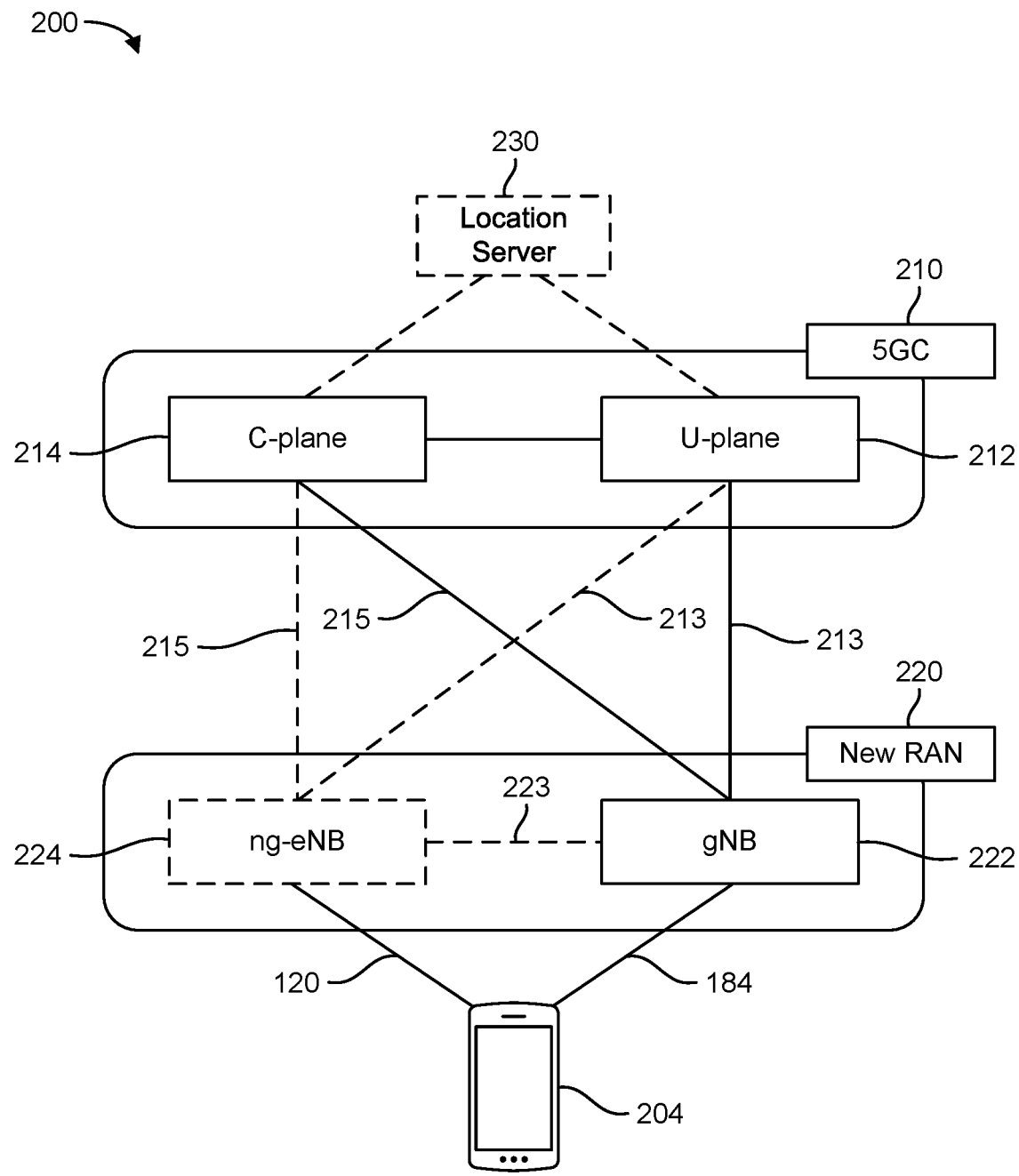
FIGS. 2A and 2B illustrate example wireless network structures, according to various aspects of the disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
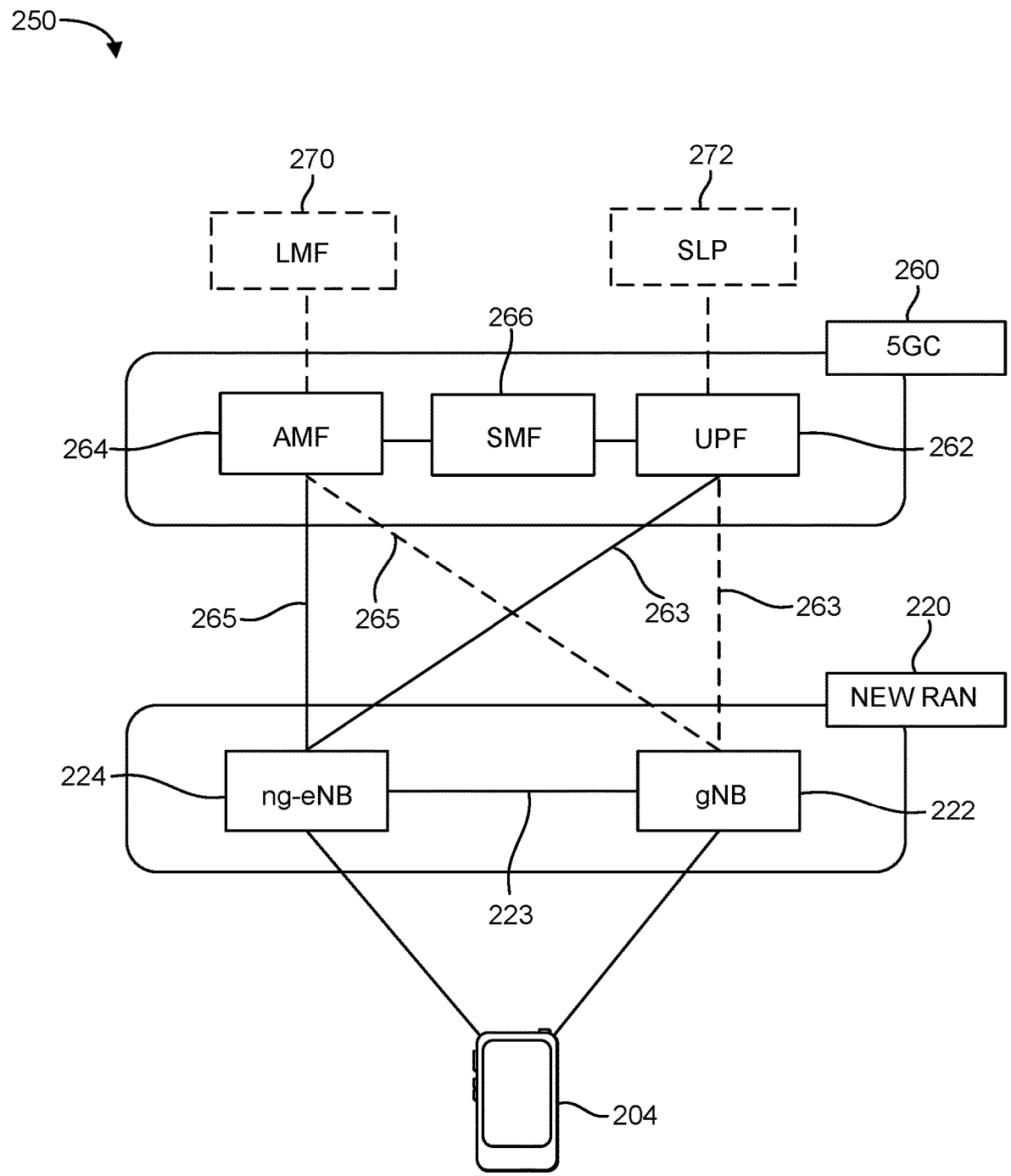

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
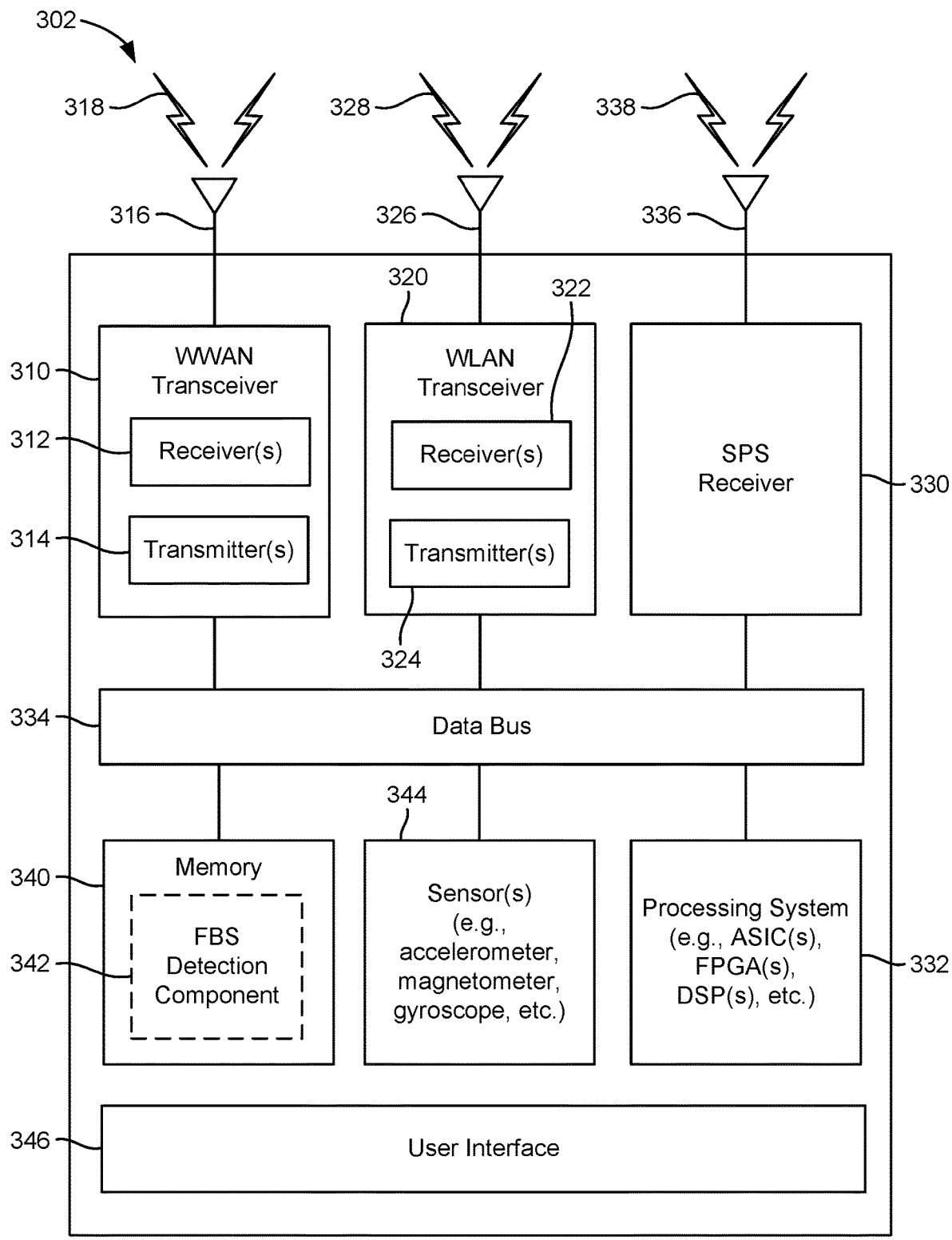
FIGS. 3A to 3C are simplified block diagrams of several sample aspects of components that may be employed in a user equipment (UE), a base station, and a network entity, respectively, and configured to support communications as taught herein.
Figure 3B:
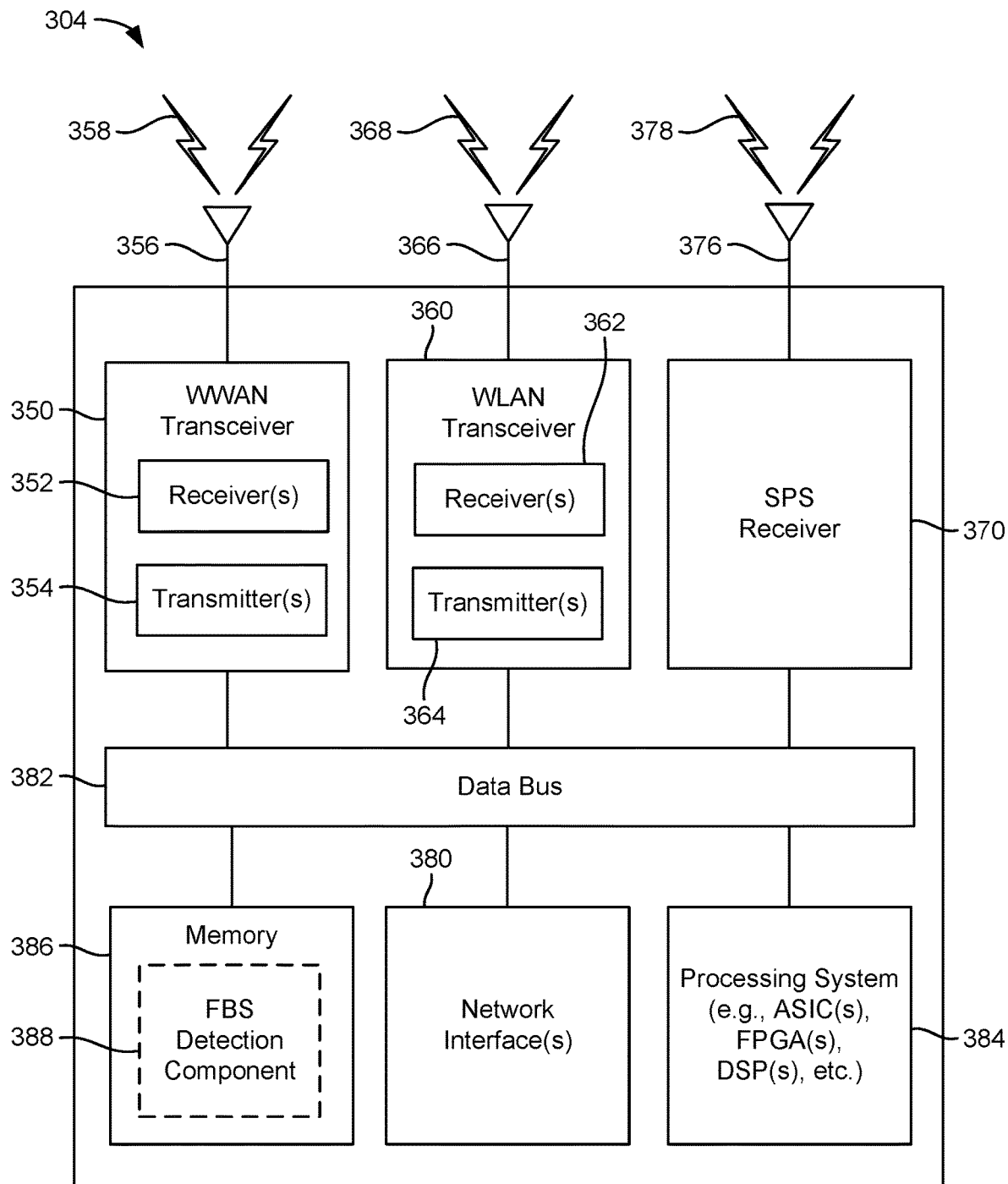
Figure 3C:
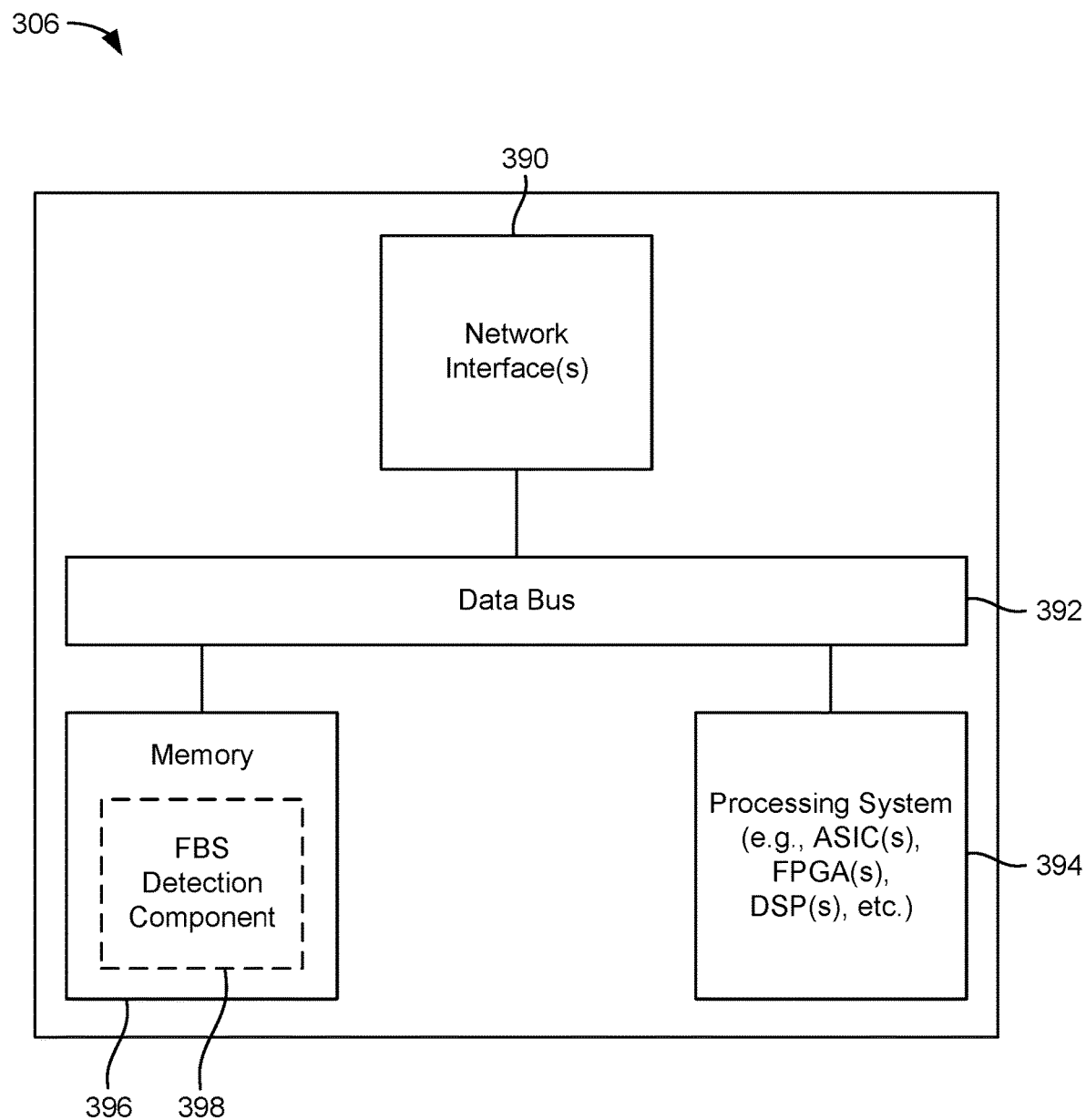

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230, the LMF 270, and the SLP 272) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., ng-eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated unit or device (e.g., embodied as a transmitter circuit and a receiver circuit of a single communication unit or communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication unit or communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370, respectively. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm. In an aspect, the SPS receivers 330 and 370 may be part of the respective communication units of the UE 302 and base station 304 described above.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, FBS detection operations, and for providing other processing functionality. The base station 304 includes a processing system 384 for providing functionality relating to, for example, FBS detection operations as disclosed herein, and for providing other processing functionality. The network entity 306 includes a processing system 394 for providing functionality relating to, for example, FBS detection operations as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include FBS detection components 342, 388, and 398, respectively. The FBS detection components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the FBS detection components 342, 388, and 398 may be external to the processing systems 332, 384, and 394 (e.g., part of a modem processing system, integrated with another processing system, etc.). Alternatively, the FBS detection components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide means for sensing or detecting movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems. In an aspect, the sensors 344 may be part of the communication unit of the UE 302 described above.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the FBS detection components 342, 388, and 398, etc.

Figure 4A:
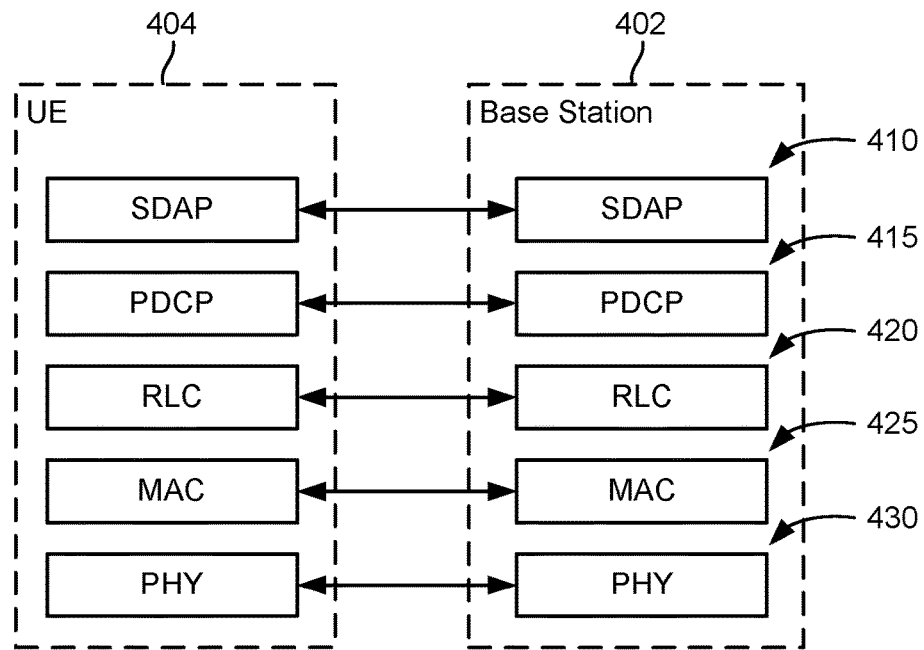
FIGS. 4A and 4B illustrate user plane and control plane protocol stacks, according to aspects of the disclosure.

FIG. 4A illustrates a user plane protocol stack, according to aspects of the disclosure. As illustrated in FIG. 4A, a UE 404 and a base station 402 (which may correspond to any of the UEs and base stations, respectively, described herein) implement, from highest layer to lowest, a service data adaptation protocol (SDAP) layer 410, a PDCP layer 415, an RLC layer 420, a MAC layer 425, and a PHY layer 430. As illustrated by the double-arrow lines in FIG. 4A, each layer of the protocol stack implemented by the UE 404 communicates with the same layer of the base station 402, and vice versa. Collectively, the SDAP layer 410, the PDCP layer 415, the RLC layer 420, and the MAC layer 425 are referred to as "Layer 2" or "L2."

Figure 4B:
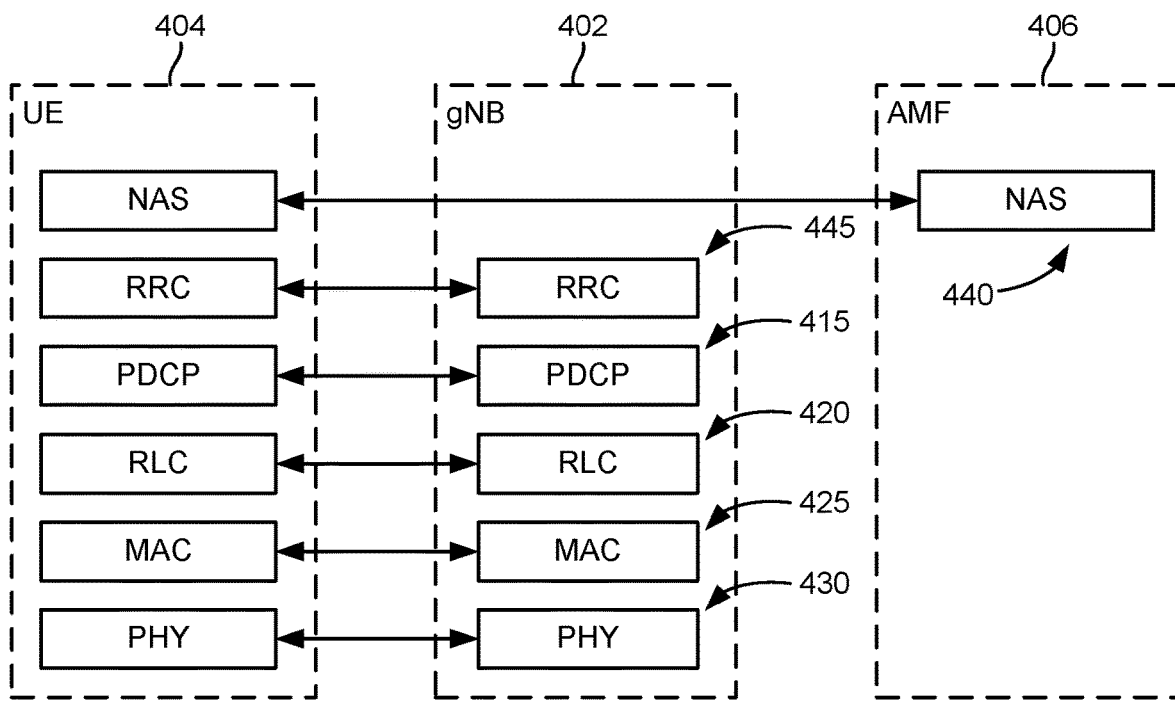

FIG. 4B illustrates a control plane protocol stack, according to aspects of the disclosure. In addition to the PDCP layer 415, the RLC layer 420, the MAC layer 425, and the PHY layer 430, the UE 404 and the base station 402 also implement an RRC layer 445. Further, the UE 404 and an AMF 406 (e.g., AMF 264) implement a NAS layer 440.

The main services and functions of the RLC layer 420 depend on the transmission mode and include transfer of upper layer PDUs, sequence numbering independent of the one in the PDCP layer 415, error correction through ARQ, segmentation and re-segmentation, reassembly of service data units (SDUs), RLC SDU discard, and RLC re-establishment. The ARQ functionality provides error correction in AM mode, and has the following characteristics: ARQ retransmits RLC PDUs or RLC PDU segments based on RLC status reports, polling for an RLC status report is used when needed by RLC, and the RLC receiver can also trigger an RLC status report after detecting a missing RLC PDU or RLC PDU segment.

The main services and functions of the PDCP layer 415 for the user plane include sequence numbering, header compression and decompression (for robust header compression (ROHC) only), transfer of user data, reordering and duplicate detection (if in-order delivery to layers above the PDCP layer 415 is required), PDCP PDU routing (in case of split bearers), retransmission of PDCP SDUs, ciphering and deciphering, PDCP SDU discard, PDCP re-establishment and data recovery for RLC AM, and duplication of PDCP PDUs. The main services and functions of the PDCP layer 415 for the control plane include ciphering, deciphering, and integrity protection, transfer of control plane data, and duplication of PDCP PDUs.

The SDAP layer 410 is an access stratum (AS) layer, the main services and functions of which include mapping between a QoS flow and a data radio bearer and marking QoS flow ID in both DL and UL packets. A single protocol entity of SDAP is configured for each individual PDU session.

The main services and functions of the RRC layer 445 include broadcast of system information related to AS and NAS, paging initiated by the 5GC (e.g., NGC 210 or 260) or RAN (e.g., New RAN 220), establishment, maintenance, and release of an RRC connection between the UE and RAN, security functions including key management, establishment, configuration, maintenance, and release of signaling radio bearers (SRBs) and data radio bearers (DRBs), mobility functions (including handover, UE cell selection and reselection and control of cell selection and reselection, context transfer at handover), QoS management functions, UE measurement reporting and control of the reporting, and NAS message transfer to/from the NAS from/to the UE.

The NAS layer 440 is the highest stratum of the control plane between the UE 404 and the AMF 406 at the radio interface. The main functions of the protocols that are part of the NAS layer 440 are the support of mobility of the UE 404 and the support of session management procedures to establish and maintain IP connectivity between the UE 404 and a packet data network. The NAS layer 440 performs EPS bearer management, authentication, EPS connection management (ECM)-IDLE mobility handling, paging origination in ECM-IDLE, and security control.

Figure 5A:
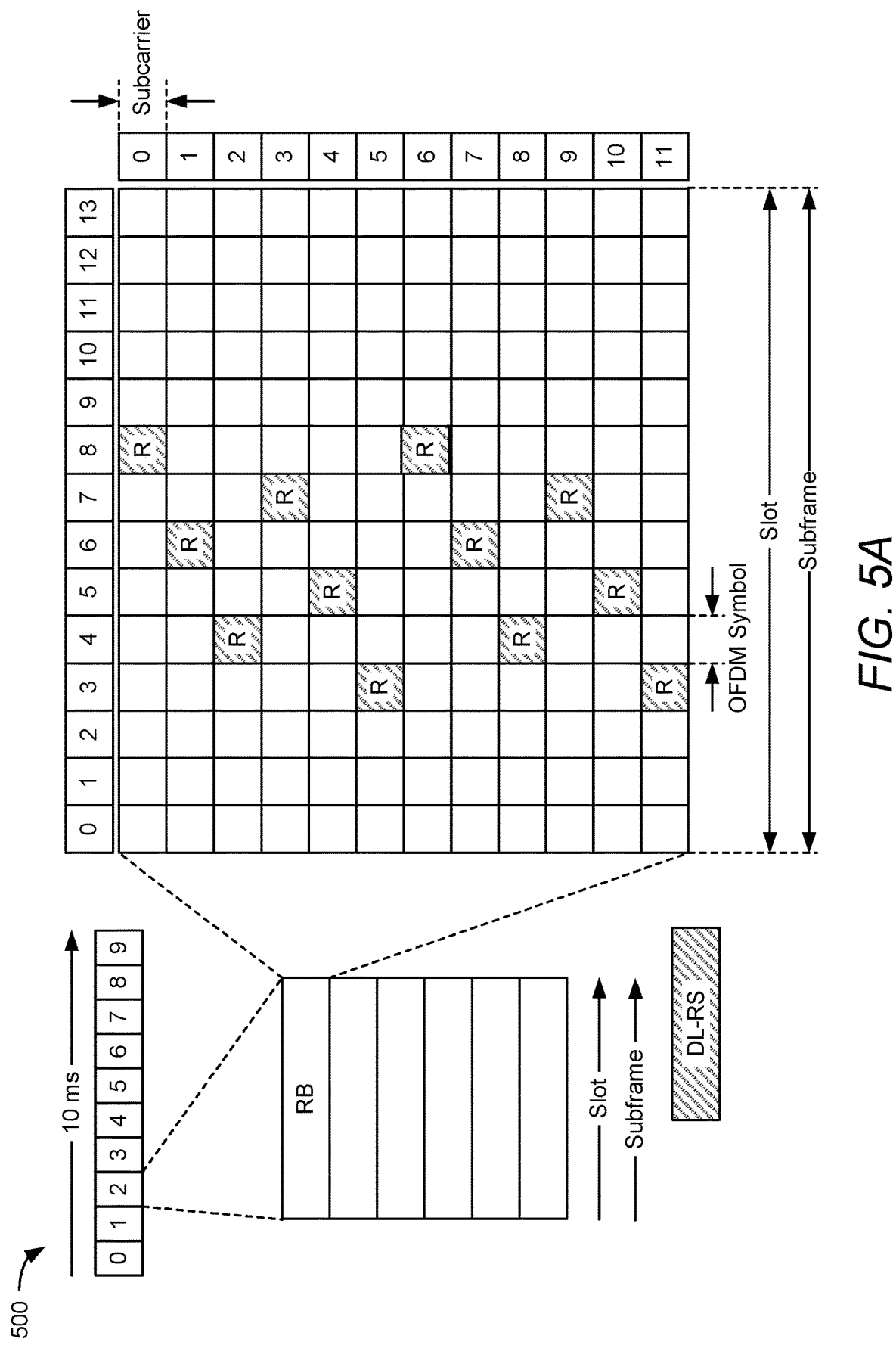
FIGS. 5A to 5D are diagrams illustrating examples of frame structures and channels within the frame structures, according to aspects of the disclosure.
Figure 5B:
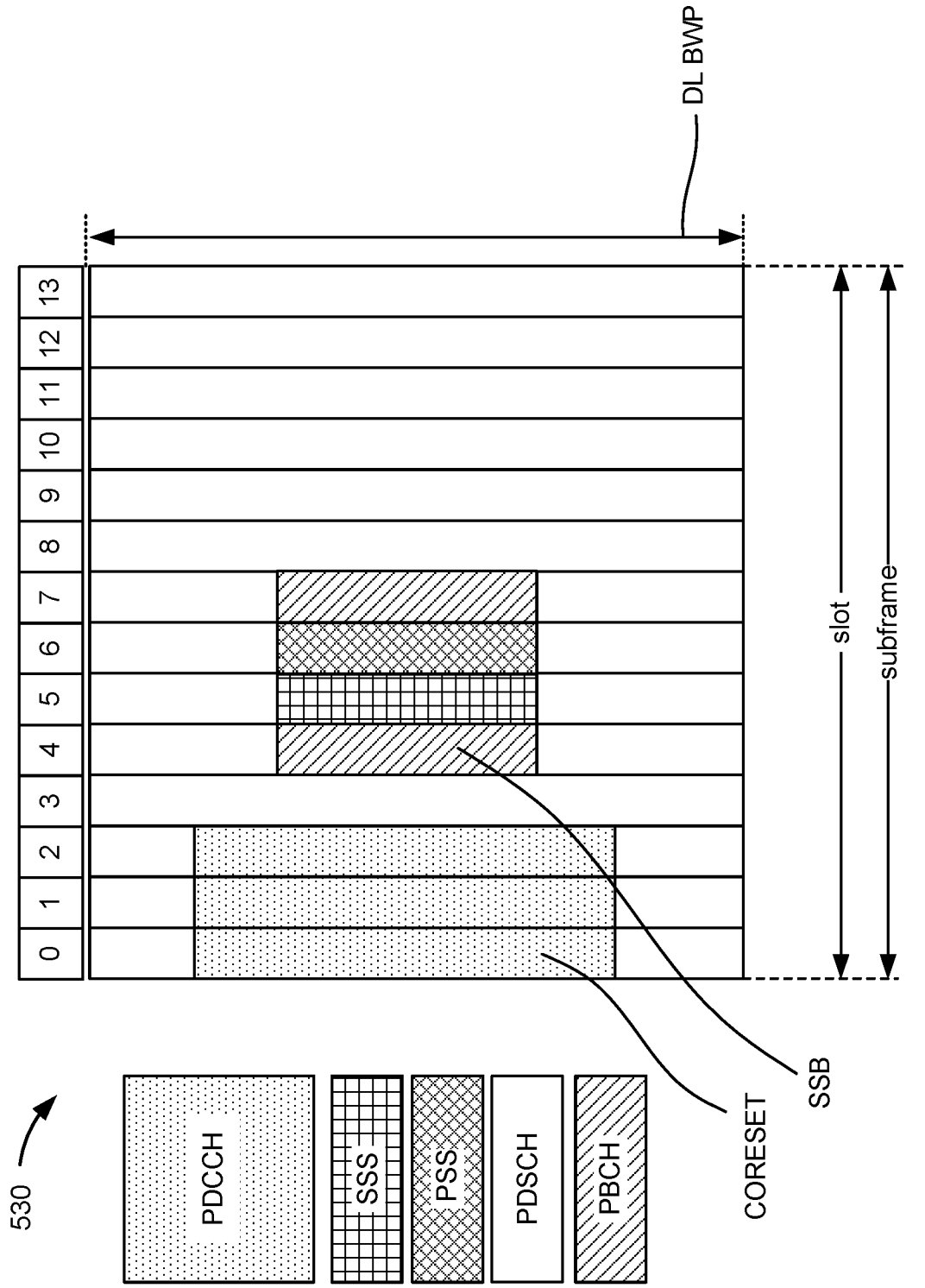
Figure 5C:
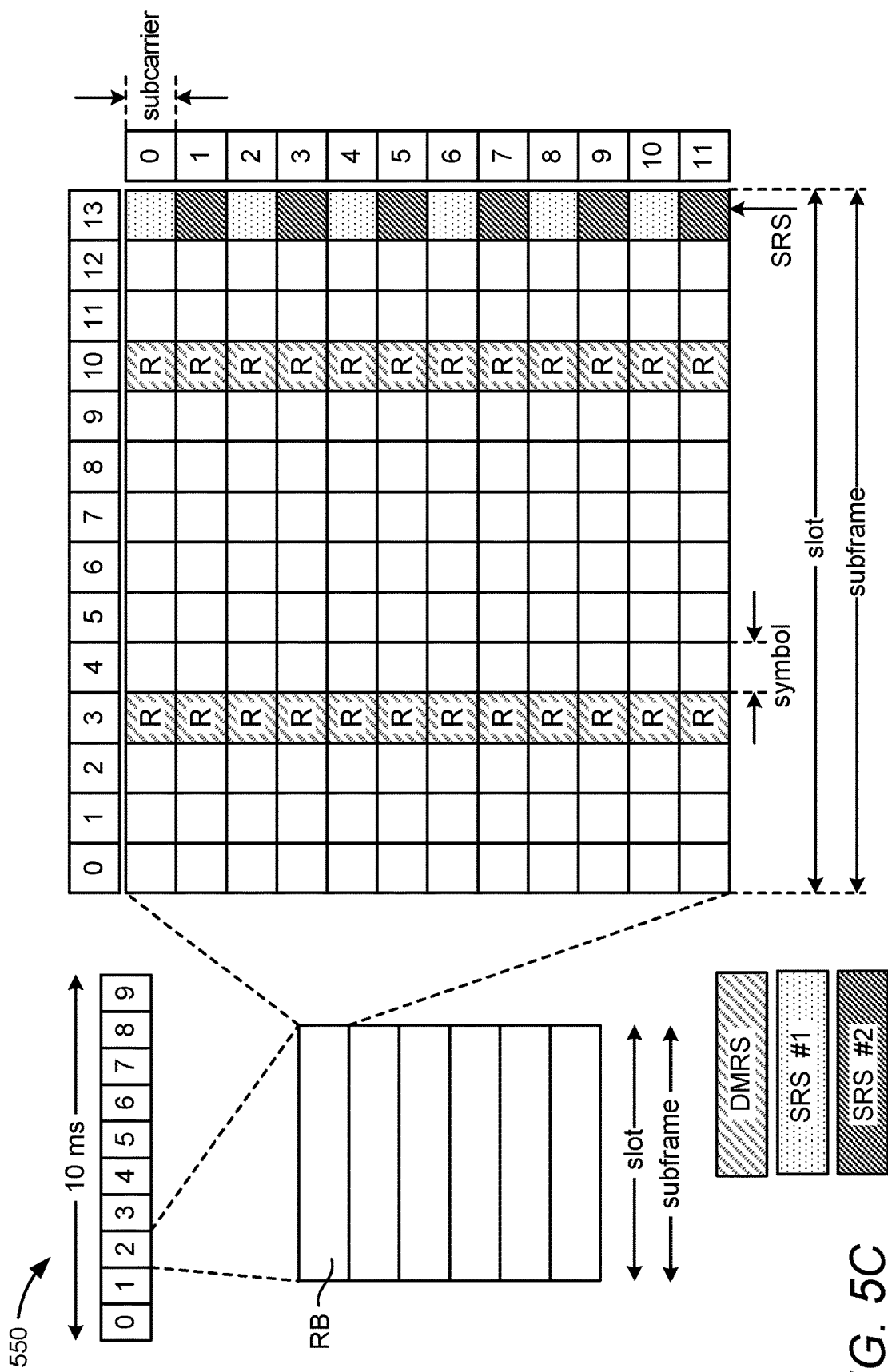
Figure 5D:
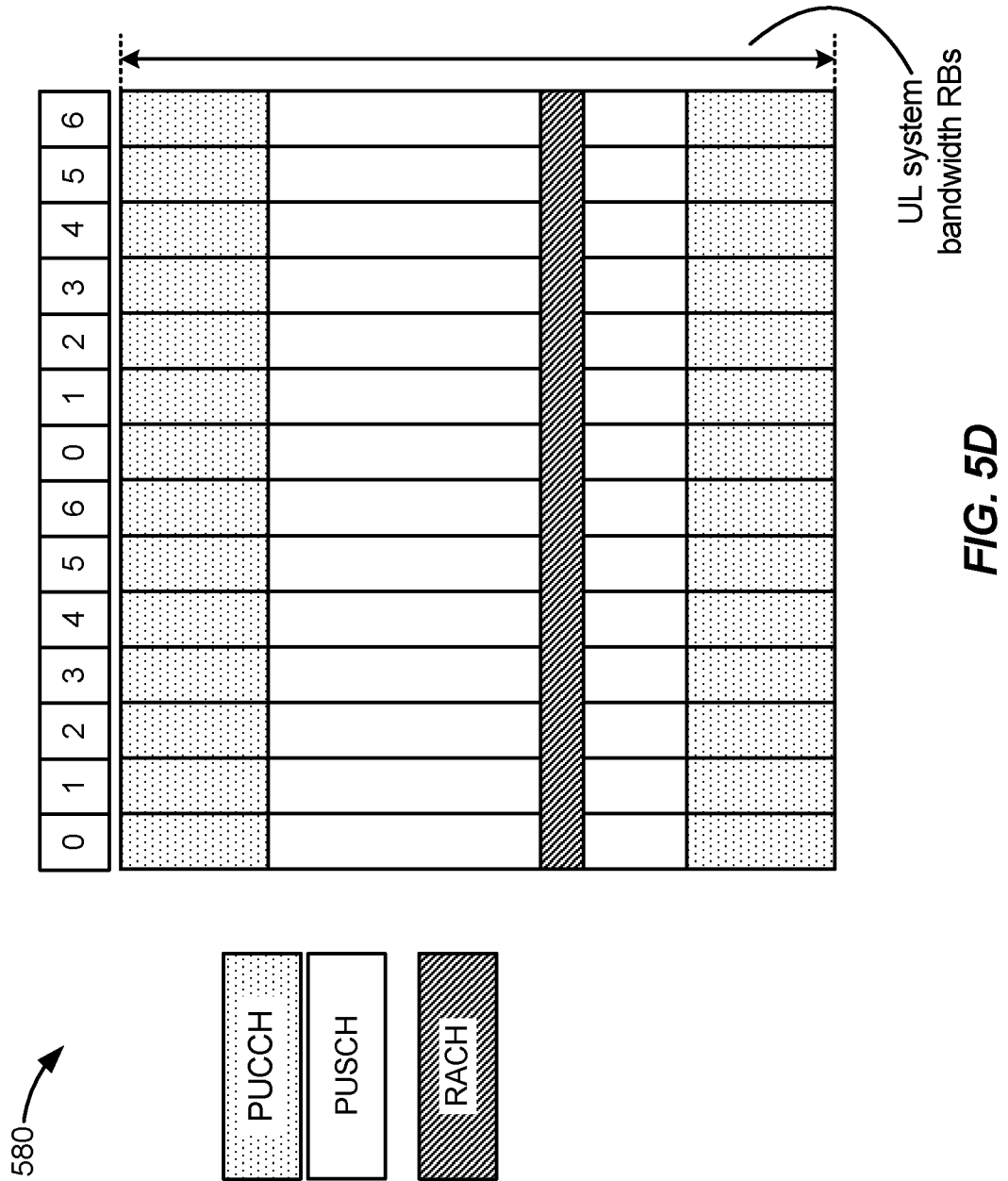

FIG. 5A is a diagram 500 illustrating an example of a downlink frame structure, according to aspects of the disclosure. FIG. 5B is a diagram 530 illustrating an example of channels within the downlink frame structure, according to aspects of the disclosure. FIG. 5C is a diagram 550 illustrating an example of an uplink frame structure, according to aspects of the disclosure. FIG. 5D is a diagram 580 illustrating an example of channels within the uplink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies ($\mu$), for example, subcarrier spacing of 15 kHz, 30 kHz, 60 kHz, 120 kHz, and 240 kHz or greater may be available. Table 1 provided below lists some various parameters for different NR numerologies.

TABLE 1

| $\mu$ | SCS (kHz) | Symbols/ Sot | Slots/ Sub-frame | Slots/ Frame | Slot Duration (ms) | Symbol Duration ($\mu$s) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 5A to 5D, a numerology of 15 kHz is used. Thus, in the time domain, a frame (e.g., 10 milliseconds (ms)) is divided into 10 equally sized subframes of 1 ms each, and each subframe includes one time slot. In FIGS. 5A to 5D, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 5A to 5D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry downlink reference (pilot) signals (DL-RS). The DL-RS may include PRS in LTE and 5G, TRS, PTRS, CRS, CSI-RS, DMRS, PSS, SSS, SSB, etc. FIG. 5A illustrates example locations of REs carrying DL-RS (labeled "R"), such as DL-PRS with a comb-6 PRS resource configuration.

FIG. 5B illustrates an example of various channels within a downlink slot of a radio frame. In NR, the channel bandwidth, or system bandwidth, is divided into multiple bandwidth parts (BWPs). A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 5B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH block). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 5B, there is one CORESET per BWP, and the CORESET spans three symbols in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 5B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., PUSCH). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

As illustrated in FIG. 5C, some of the REs carry demodulation reference signals (DMRS) for channel estimation at the base station. The UE may additionally transmit sounding reference signals (SRS) in, for example, the last symbol of a subframe. The SRS may have a comb structure, and a UE may transmit SRS on one of the combs. The comb structure (also referred to as the "comb size") indicates the number of subcarriers in each symbol period carrying a reference signal (here, SRS). For example, a comb size of comb-4 means that every fourth subcarrier of a given symbol carries the reference signal, whereas a comb size of comb-2 means that every second subcarrier of a given symbol carries the reference signal. In the example of FIG. 5C, the illustrated SRS are both comb-2. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

FIG. 5D illustrates an example of various channels within an uplink subframe of a frame, according to aspects of the disclosure. A random access channel (RACH), also referred to as a physical random access channel (PRACH), may be within one or more subframes within a frame based on the PRACH configuration. The PRACH may include six consecutive RB pairs within a subframe. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in positioning assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

In an UL-TDOA session, the UE transmits uplink reference signals (e.g., SRS) that are received by a reference base station and one or more non-reference base stations. The base stations report the times of arrival (ToAs) of the uplink reference signals to a positioning entity (e.g., the UE, the serving base station, location server 230, LMF 270, SLP 272), which calculates the RSTD of the uplink reference signals between the reference base station and each non-reference base station. Based on the known locations of the involved base stations and the RSTD measurements, the positioning entity can estimate the UE's location.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270, SLP 272) may provide positioning assistance data (also referred to as location assistance information, positioning assistance information, assistance information, assistance data, and the like) to the UE. For example, the assistance data may include identifiers of the base stations (or the cells/TRPs of the base stations) from which to measure reference signals, the reference signal configuration parameters (e.g., the number of consecutive positioning slots, periodicity of positioning slots, muting sequence, frequency hopping sequence, reference signal identifier (ID), reference signal bandwidth, slot offset, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In a DL-TDOA positioning session, for example, based on the PCI of the current serving cell reported by the UE, the assistance information may indicate the PCI of the reference cell and neighbor cells so that the UE can perform the required measurements in an efficient manner. In this case, the UE would typically only perform DL-TDOA measurements on reference signals from cells whose PCI's are listed in the assistance information. The location server typically provides this assistance information to the UE in secure messages that are integrity protected and ciphered (i.e., encrypted), as described further below. It can be safely assumed that an adversary, such as an FBS, would not have the ability to manipulate such assistance information. However, it should be noted that assistance information may not always be available or required by the UE. For example, the UE may choose to not request assistance information and decide to perform the necessary positioning measurements on all of the cells it is able to detect. Also, for certain positioning techniques that rely on measurements at the base station or measurements for E-CID techniques at the UE, positioning assistance information may not be applicable.

Additional (or side) information is used along with the positioning measurements to compute the UE's location. For 5GNR positioning techniques, such side information may include, among other things, the geographic locations of the base stations supporting the cells that are involved in the positioning measurements. For measurements at the UE, the side information would include the location of the base stations from which the UE is measuring reference signals. For measurements at the base station, the side information would include the location of the base station's physical site.

Note that the computation of UE location may take place at the UE or at a location server in the network. In any case, the computation entity needs to have access to both the positioning measurements as well as the necessary side information to perform the location computation. Like positioning assistance information, it can be assumed that the side information is provided in a secure manner to the computation entity and thus not malleable by an adversary such as an FBS. For example, the side information may be transported by encrypted higher layers, rather than unencrypted lower layers, as discussed further below.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 6:
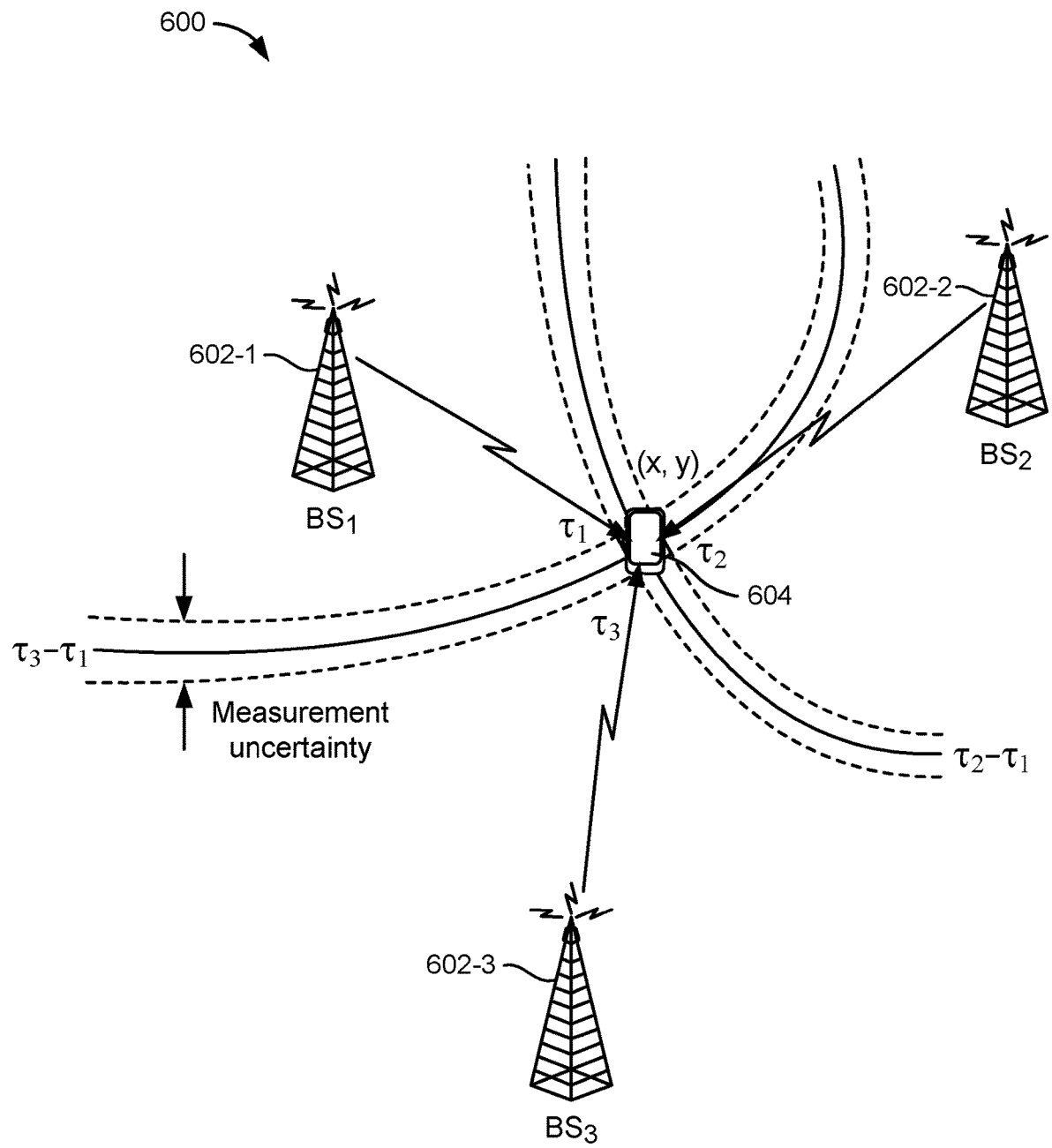
FIG. 6 is a diagram illustrating an example technique for determining a position of a mobile device using information obtained from a plurality of base stations.

FIG. 6 illustrates a DL-TDOA positioning procedure in an example wireless communications system 600, according to aspects of the disclosure. In the example of FIG. 6, a UE 604 (e.g., any of the UEs described herein) is attempting to calculate an estimate of its location, or assist another entity (e.g., a base station or core network component, another UE, a location server, a third party application, etc.) to calculate an estimate of its location. The UE 604 may communicate wirelessly with a plurality of base stations 602-1, 602-2, and 602-3 (collectively, base stations 602), which may correspond to any combination of the base stations described herein, using RF signals and standardized protocols for the modulation of the RF signals and the exchange of information packets. By extracting different types of information from the exchanged RF signals, and utilizing the layout of the wireless communications system 600 (e.g., the base stations' 602 locations, geometry, etc.), the UE 604 may determine its location, or assist in the determination of its location, in a predefined reference coordinate system. In an aspect, the UE 604 may specify its location using a two-dimensional (2D) coordinate system; however, the aspects disclosed herein are not so limited, and may also be applicable to determining locations using a three-dimensional (3D) coordinate system, if the extra dimension is desired. Additionally, while FIG. 6 illustrates one UE 604 and four base stations 602, as will be appreciated, there may be more UEs 604 and more or fewer base stations 602.

To support location estimates, the base stations 602 may be configured to broadcast positioning reference signals (e.g., PRS, TRS, CRS, CSI-RS, etc.) to UEs 604 in their coverage area to enable a UE 604 to measure characteristics of such reference signals. For example, as described above, the DL-TDOA positioning method is a multilateration method in which the UE 604 measures the time difference, known as an RSTD, between specific downlink reference signals (e.g., PRS, TRS, CRS, CSI-RS, etc.) transmitted by different pairs of base stations 602, and either reports these RSTD measurements to a location server (e.g., location server 230, LMF 270, SLP 272) or computes a location estimate itself from these RSTD measurements.

Generally, RSTDs are measured between a reference cell (e.g., a cell supported by base station 602-1 in the example of FIG. 6) and one or more neighbor cells (e.g., cells supported by base stations 602-2 and 602-3 in the example of FIG. 6). The reference cell remains the same for all RSTDs measured by the UE 604 for any single positioning use of DL-TDOA and would typically correspond to the serving cell for the UE 604 or another nearby cell with good signal strength at the UE 604. In an aspect, the neighbor cells would normally be cells supported by base stations different from the base station for the reference cell, and may have good or poor signal strength at the UE 604. The location computation can be based on the measured time differences (e.g., RSTDs) and knowledge of the involved base stations' 602 locations and relative transmission timing (e.g., regarding whether base stations 602 are accurately synchronized or whether each base station 602 transmits with some known time difference relative to other base stations 602).

To assist positioning operations, the location server (e.g., location server 230, LMF 270, SLP 272) may provide DL-TDOA assistance data to the UE 604 for the reference cell and the neighbor cells relative to the reference cell. For example, the assistance data may include identifiers (e.g., PCI, VCI, CGI, etc.) for each cell of a set of cells that the UE 604 is expected to measure (here, cells supported by the base stations 602). The assistance data may also provide the center channel frequency of each cell, various reference signal configuration parameters (e.g., the number of consecutive positioning subframes, periodicity of positioning subframes, muting sequence, frequency hopping sequence, reference signal identifier, reference signal bandwidth), and/or other cell related parameters applicable to DL-TDOA. The DL-TDOA assistance data may indicate the serving cell for the UE 604 as the reference cell.

In some cases, DL-TDOA assistance data may also include "expected RSTD" parameters, which provide the UE 604 with information about the RSTD values the UE 604 is expected to measure at its current location between the reference cell and each neighbor cell, together with an uncertainty of the expected RSTD parameter. The expected RSTD, together with the associated uncertainty, may define a search window for the UE 604 within which the UE 604 is expected to measure the RSTD value. DL-TDOA assistance information may also include reference signal configuration information parameters, which allow a UE 604 to determine when a reference signal positioning occasion occurs on signals received from various neighbor cells relative to reference signal positioning occasions for the reference cell, and to determine the reference signal sequence transmitted from various cells in order to measure a reference signal ToA or RSTD.

In an aspect, while the location server (e.g., location server 230, LMF 270, SLP 272) may send the assistance data to the UE 604, alternatively, the assistance data can originate directly from the base stations 602 themselves (e.g., in periodically broadcasted overhead messages, etc.). Alternatively, the UE 604 can detect neighbor base stations itself without the use of assistance data.

The UE 604 (e.g., based in part on the assistance data, if provided) can measure and (optionally) report the RSTDs between reference signals received from pairs of base stations 602. Using the RSTD measurements, the known absolute or relative transmission timing of each base station 602, and the known location(s) of the reference and neighboring base stations 602, the network (e.g., location server 230/ LMF 270/SLP 272, a base station 602) or the UE 604 may estimate the location of the UE 604. More particularly, the RSTD for a neighbor cell "k" relative to a reference cell "Ref" may be given as $(ToA_k-ToA_{Ref})$, where the ToA values may be measured modulo one subframe duration (1 ms) to remove the effects of measuring different subframes at different times. In the example of FIG. 6, the measured time differences between the reference cell of base station 602-1 and the cells of neighboring base stations 602-2 and 602-3 are represented as $\tau_2-\tau_1$ and $\tau_3-\tau_1$, where $\tau_1$, $\tau_2$, and $\tau_3$ represent the ToA of a reference signal from the transmitting antenna(s) of base station 602-1, 602-2, and 602-3, respectively. The UE 604 may then convert the ToA measurements for different network nodes to RSTD measurements and (optionally) send them to the location server. Using (i) the RSTD measurements, (ii) the known absolute or relative transmission timing of each base station 602, (iii) the known location(s) of the physical TRPs for the reference and neighboring base stations 602, and/or (iv) directional reference signal characteristics, such as the direction of transmission, the UE's 604 location may be determined (either by the UE 604 or the location server).

Still referring to FIG. 6, when the UE 604 obtains a location estimate using DL-TDOA measured time differences, the necessary additional data (e.g., the base stations' 602 locations and relative transmission timing) may be provided to the UE 604 by the location server. In some implementations, a location estimate for the UE 604 may be obtained (e.g., by the UE 604 itself or by the location server) from DL-TDOA measured time differences and from other measurements made by the UE 604 (e.g., measurements of signal timing from GPS or other global navigation satellite system (GNSS) satellites). In these implementations, known as hybrid positioning, the DL-TDOA measurements may contribute towards obtaining the UE's 604 location estimate but may not wholly determine the location estimate.

As discussed above, 5G NR positioning techniques rely on measurements of reference signals to determine the UE's (a.k.a. target's) location. The measurements can be performed at the UE based on downlink reference signals (e.g., SSB, CSI-RS, PRS, TRS, etc.) transmitted by multiple cells, as in the case of DL-TDOA, or at the base station based on uplink reference signals (e.g., RACH preambles, DMRS, SRS, etc.) transmitted by the UE, as in the case of UL-AoA. In contrast, positioning techniques based on other technologies, such as satellite (e.g., GNSS), WLAN, Bluetooth®, etc., rely on measurements based on reference signals transmitted/received using the respective technology. Note that even for positioning techniques based on other technologies, the positioning measurements and/or computed UE location may be transported over the 5G NR system to the location server. Further, assistance information to facilitate positioning measurements based on other technologies may be provided over 5G NR to the entity performing the measurements, such as in the case of assisted GNSS (A-GNSS).

In cellular RATs, such as LTE and 5G NR, security for the air interface is implemented at the PDCP layer (e.g., PDCP layer 415) through ciphering and integrity protection of data and signaling packets. Any signaling that originates below the PDCP layer (e.g., at the RLC layer 420, MAC layer 425, or PHY layer 430) is not secured. In particular, PHY layer (e.g., PHY layer 430) channels and signals such as the SSB, PDCCH, PUCCH, RACH, CSI-RS, and SRS, are not protected through any security primitives. This means that in an open standard such as 5G NR, an adversary can construct these PHY layer channels and signals and launch various attacks against the system. Such attacks can include selective jamming against a particular PHY channel and FBS attacks.

An FBS poses a security threat to wireless communications systems. An FBS may transmit synchronization signals (e.g., SSBs) to get a UE to synchronize to the FBS. Once a UE is camped on/connected to the FBS, the FBS may be able to launch different types of attacks against the UE.

As a first example attack, an FBS attacker may broadcast an SSB to nearby UEs. Since UEs are always measuring the signal strength of nearby cells for mobility purposes, a UE in an RRC_CONNECTED state in the vicinity of the FBS will measure and report the signal strength and PCI as obtained from the broadcasted SSB to its serving cell. If there is a legitimate cell with the same PCI connected to the serving base station (i.e. the base station supporting the serving cell), the serving base station may initiate a handover (HO) to the reported cell (i.e., the legitimate cell having the same PCI that the FBS is broadcasting in the SSB). However, since the UE is measuring the FBS' SSB and not a legitimate cell, the handover to the legitimate cell will likely fail because the UE is not actually communicating with the legitimate cell to perform the handover. In this way, the FBS attacker can cause call drops (or HO failures).

As a second example attack, an FBS attacker may listen to and record the system information (SI), including the MIB, remaining minimum system information (RMSI), and other system information (OSI), transmitted by a legitimate cell. The FBS then broadcasts an SSB (possibly with a different PCI) and a PDCCH/PDSCH carrying the same SI. A UE in an RRC_IDLE or RRC_INACTIVE state in the vicinity of the FBS may measure good SSB signal strength from the FBS and camp on the FBS after reading the SI. The UE would then not receive mobile-terminated (MT) or emergency calls and remain unaware of the existence of the FBS until the UE initiates signaling on the uplink and does not receive a (integrity protected) response. In this way, the FBS may successfully launch a denial-of-service (DOS) attack and remain undetected for a substantial amount of time.

As a third example attack, a man-in-the-middle (MITM) FBS may sit between a UE and a legitimate base station in the form of a malicious repeater. The FBS acts as a legitimate cell towards the UE and as a UE towards the legitimate base station. In particular, the FBS may receive transmissions from the legitimate base station and selectively drop some CSI-RS transmissions. Then, any UE connected to the legitimate base station through the FBS would occasionally measure and report poor CSI for that base station, which may result in lower downlink throughput, and in extreme cases, application layer data outages.

Thus, as will be appreciated, an FBS can pose a significant threat to a UE's connectivity, and it would be beneficial for a UE to be able to detect an FBS to avoid connecting to it or to handover away from it. Accordingly, the present disclosure provides techniques to use positioning information to detect an FBS.

For the following discussion, it should be noted that in a cellular system such as 5G NR, a cell is uniquely identified by its CGI. A cell can also be identified by its PCI, although the PCI may only be unique within a certain geographic area and not globally. As described above, a UE can infer the PCI of a cell upon decoding the SSB transmitted by the cell.

The present disclosure provides techniques to use positioning as a means to detect the presence of an FBS. The following describes various methods by which an FBS can be detected by using positioning techniques, such as the positioning techniques described above (e.g., DL-TDOA, RTT, E-CID, etc.). The means to detect an FBS depend on the actions of the FBS, whether the positioning measurements are performed at the UE or the base station, and the content of the positioning assistance information and the side information. The present disclosure also provides mitigation steps that can be followed once an FBS is detected, thereby limiting the impact of threats posed by FBS attacks.

A first technique described herein can be used in a scenario where the UE performs at least some of the positioning measurements (e.g., as in DL-TDOA, E-CID, RTT), the FBS transmits an SSB, and the FBS-broadcasted PCI is not listed in assistance information. In order to cause a UE to synchronize to an FBS, the FBS would typically broadcast synchronization signals, such as an SSB. If the FBS broadcasts an SSB, then a UE in the vicinity of the FBS may in fact measure and decode (i.e., detect) the SSB transmitted by the FBS when the UE performs a periodic cell search. However, if the PCI inferred from the SSB of the FBS is not listed in the assistance information provided to the UE for DL-TDOA, then it may indicate that the detected cell is an FBS.

Additional metrics, such as a high signal strength measured from a cell not listed in positioning assistance information, could be used to reinforce the FBS hypothesis. This is because the signal strength at the UE of the SSB from the FBS is likely to be high, but the PCI derived from the SSB may not be included in the assistance information. Since the assistance information is likely to include all, or at least most, nearby cells due to their higher signal strength and therefore easier detectability, a cell having a strong signal strength that is not in the assistance information may indicate that the cell is an FBS.

In some cases, however, the location server (e.g., location server 230, LMF 270, SLP 272) may omit a legitimate cell from assistance information based on prior knowledge or bias against using that cell for positioning purposes. Nonetheless, upon observing such a cell (i.e., a cell having good signal strength that was not included in the assistance information), the UE may report its observation to the location server and rely on the location server to take further action. If the location server receives such reports from multiple UE's pointing to the same cell as a potential FBS, this can serve to reinforce the FBS hypothesis related to a particular cell.

In some cases, the PCI may not serve as a unique identifier for a cell, as noted above. As such, an FBS and a legitimate cell may share the same PCI. In such cases, the UE may also read the SI broadcasted by the detected cells to obtain their respective CGIs to determine if either CGI is listed in the assistance information. If a CGI is not listed, the detected cell could be a potential FBS.

A second technique described herein can be used in a scenario where the UE performs at least some of the positioning measurements (e.g., as in DL-TDOA, E-CID, RTT) and the PCI broadcasted by the FBS is listed in the positioning assistance information. Assuming that the FBS shares the same PCI as a legitimate cell in the vicinity of the UE, the PCI of the FBS will be included in the assistance information provided to the UE (unless the location server is excluding the PCI of the legitimate cell from the assistance information for some reason). However, if the UE synchronizes to the FBS, the UE will perform positioning measurements on reference signals (e.g., SSB, CSI-RS, PRS, etc.) transmitted by the FBS. Assuming that the FBS is at a different physical location than the legitimate cell sharing the same PCI (the likely scenario), then when the measurements of the FBS are combined with the side information pertaining to the location of the legitimate cell, the computed UE location will be incorrect.

To detect this situation, the computed UE location can be compared with the UE's location as computed using a different technology, such as GNSS, Bluetooth®, WLAN, etc. A sufficiently large discrepancy between the locations computed using 5G NR (e.g., DL-TDOA, RTT, E-CID, etc.) and the other technology(ies) may indicate the presence of an FBS. The UE location computation can be performed at the UE or at the location server (e.g., location server 230, LMF 270, SLP 272) based on measurements taken and/or reported by the UE. Further, the comparison of the UE's location as calculated from 5G NR techniques (e.g., DL-TDOA, RTT, E-CID, etc.) and non-5G NR techniques (e.g., GNSS, Bluetooth®, WLAN, etc.) may be performed at the UE or the location server.

Note that the UE synchronizing to the FBS's SSB is not a prerequisite for this detection technique. Rather, if the UE performs positioning measurements on any reference signals transmitted by the FBS (whether SSB, CSI-RS, PRS, etc.), there may be a discrepancy between the UE's location as computed by a 5G NR technique and a non-5G NR technique that can serve as a detection mechanism for FBS.

Typically, measurements from four or more cells are needed to determine a UE's location based on DL-TDOA techniques, as described above with reference to FIG. 6. While the technique presented here can be used to detect the possible presence of an FBS, it is not straightforward to infer which of the measured cells is responsible for the incorrect location computation and may therefore be labeled as a potential FBS. However, if measurements and location comparison results for multiple UE's are available to the location server, the location server may be able to determine a single cell in common among the different measurements and location comparison results and declare that cell as an FBS with sufficient confidence.

A third technique described herein can be used in a scenario where the UE performs at least some of the positioning measurements (e.g., as in DL-TDOA, E-CID, RTT) and does not receive positioning assistance information. If there is no assistance information provided to the UE, the UE may perform positioning measurements on all cells that it can detect. Such measurements may include measurements of reference signals transmitted by an FBS. Once the UE's positioning measurements are provided to the location computation entity (e.g., the location server or the UE), the side information at the location computation entity may or may not include the location of the physical cell site (i.e., the location of the base station) corresponding to the identity (PCI and/or CGI) of the FBS.

If the side information includes the location of a base station corresponding to the PCI of the FBS, that location would represent the location of a legitimate cell. In that case, the situation is the same as the one described above with reference to the second technique described herein, and the same FBS detection scheme of comparing the UE's location computed using a 5G NR technique and a non-5G NR technique can be used to detect the presence of an FBS.

If the side information does not include the location of a base station corresponding to a reported cell identity (PCI and/or CGI), then the situation is the same as the one described above with reference to the first technique described herein. In that case, the presence of positioning measurements corresponding to an unknown cell identity may be used as an indication of the presence of an unexpected cell, such as an FBS in the vicinity of the UE. As described above, additional information, such as a high signal strength measured from a cell without associated side information, could be used to reinforce the FBS detection hypothesis.

A fourth technique described herein can be used in a scenario where a 5G NR cell performs the positioning measurements, such as in the case of an uplink-based or downlink-and-uplink-based positioning technique (e.g., E-CID, UL-TDOA, RTT, UL-AoA, DL-AoD, etc.). This technique can be used to detect an MITM FBS sitting between a UE and a legitimate base station in the form of a malicious repeater. Specifically, the FBS acts as a legitimate base station towards the UE and as a UE towards the legitimate base station. However, it may modify, inject, or drop transmissions in either direction, causing disruption to the communication link between the UE and the legitimate base station.

If an MITM FBS is injecting or modifying transmissions on the uplink towards the legitimate base station, the positioning measurements at the base station would be based on uplink transmissions (e.g., RACH, SRS, DMRS, etc.) from the FBS rather than the UE. Consequently, the calculated location would be that of the FBS and not the UE. Assuming that the FBS is at a different physical location than the UE (the likely scenario), the location of the UE as computed by the uplink positioning technique can be compared with the UE's location as computed using a different technology, such as GNSS, Bluetooth®, and/or WLAN. A sufficiently large discrepancy between the locations computed using the 5G NR technique (e.g., E-CID, UL-TDOA, RTT, UL-AoA, etc.) and the other technology(ies) can be used to detect the presence of an FBS. As an added benefit, the computed location based on the 5G NR measurements (i.e., the location of the UE that is actually the location of the FBS) could be used to pin-point the location of the FBS.

A fifth technique for detecting the presence of an FBS disclosed herein uses outlier detection. The premise behind outlier detection lies in deriving a location estimate for a UE from a subset of positioning measurements and then checking for consistency between the location estimate based on that subset and the location estimates based on other subsets of positioning measurements. If the subset rejected outliers correctly, it will lead to a location estimate that agrees well with other measurements outside the subset.

ToA measurement outliers can occur for a number of reasons, including (1) poor signal-to-noise ratio (SNR) (which can result in a large error in ToA), (2) non-line-of-sight (NLOS) links (which may lead to over-estimation of ToA), and (3) cells with a large synchronization error. An FBS may also appear as an outlier if the measurements are performed based on reference signals transmitted by the FBS but the side information includes the geographic location of a legitimate cell sharing the same cell identifier (e.g., PCI and/or CGI) as the FBS. That is, while the ToAs of the reference signals transmitted by the FBS may be accurate, they will not be the expected ToAs for reference signals transmitted by the legitimate cell that the FBS is imitating.

Figure 7A:
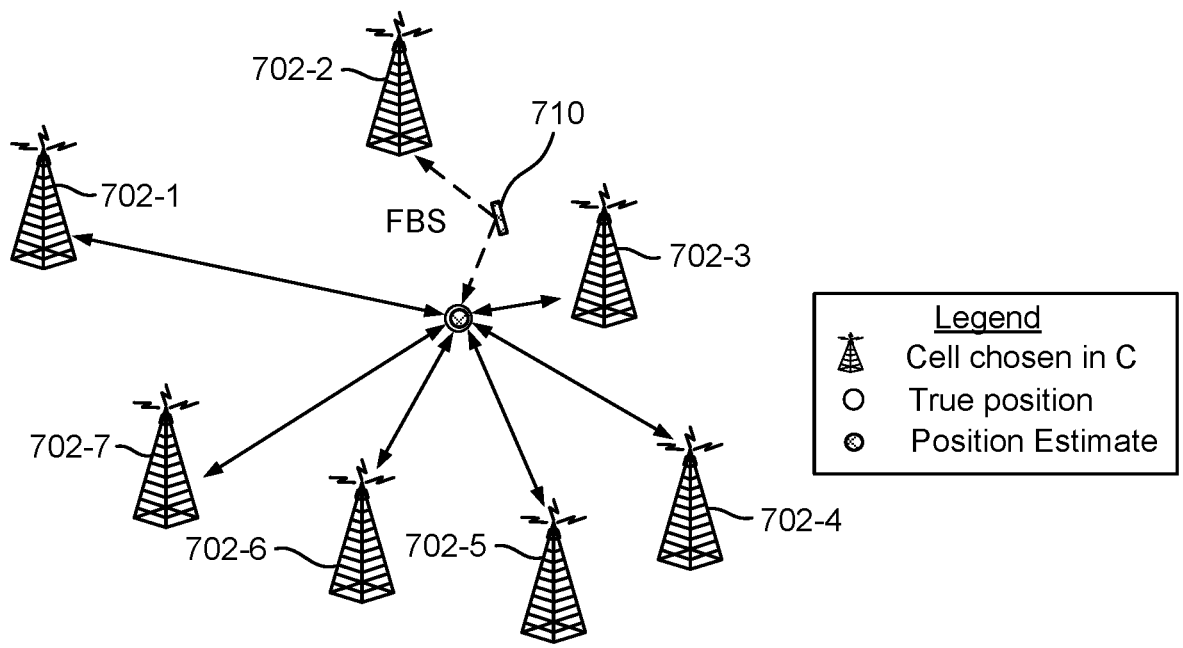
FIGS. 7A and 7B are diagrams illustrating an example technique for detecting a potential FBS using information obtained from a plurality of cells.
Figure 7B:
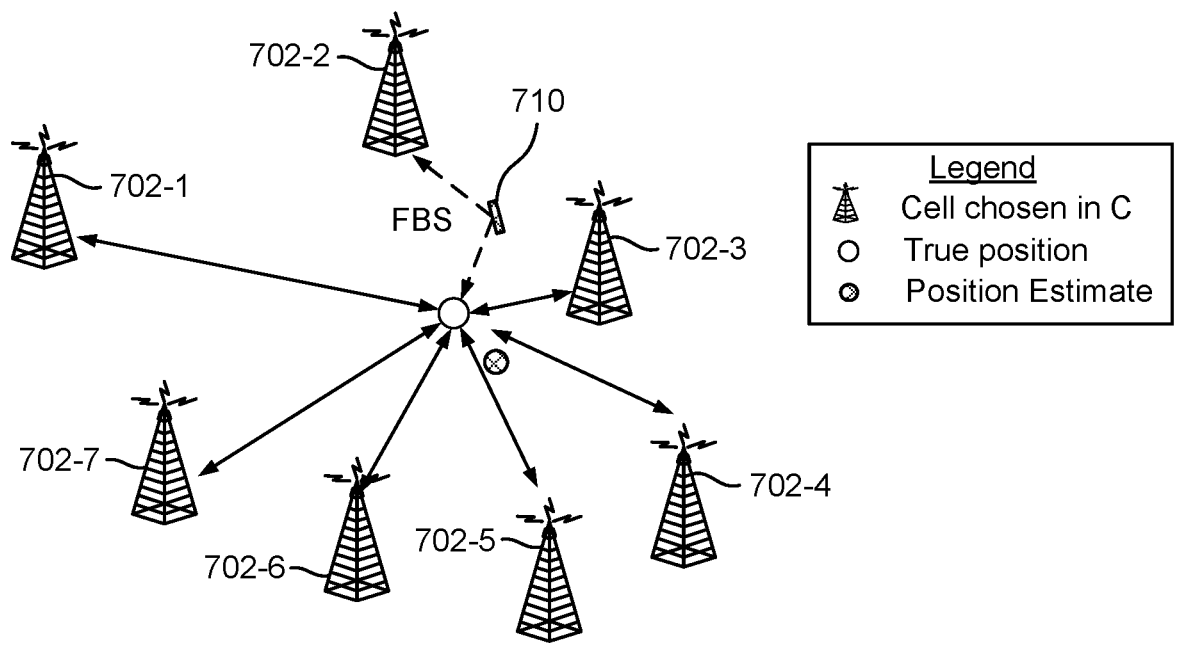

FIGS. 7A and 7B illustrate a random sampling and consensus method (referred to as a "RANSAC" method) for positioning outlier detection, according to aspects of the disclosure. The RANSAC method can be performed as follows. First, the location computation entity (e.g., the location server or the UE) identifies an initial set of cells "U" whose reference signals can be detected at the UE (e.g., based on link quality) for positioning measurements. In the example of FIGS. 7A and 7B, 'U' is the set of cells corresponding to base stations 702-1 to 702-7.

Second, from the set of cells 'U,' the location computation entity randomly chooses a subset 'C' of 'K' cells. In the example of FIG. 7A, 'C' is the set of cells corresponding to base stations 702-1, 702-3, 702-5, and 702-7, and in the example of FIG. 7B, 'C' is the set of cells corresponding to base stations 702-1, 702-2, 702-3, and 702-4. In both cases, 'K' is four. Using the observed ToA measurements of reference signals transmitted from the subset of cells C,' the location computation entity estimates the location of the UE. In an aspect, the UE in FIGS. 7A and 7B (not shown, but the true location of which is shown by a circle) may be engaged in an RTT positioning session with each cell in the set of cells 'U,' or a DL-TDOA positioning session with pairs of cells in the set of cells 'U.'

Using the calculated location estimate, the location computation entity computes the expected ToA measurements for the remaining cells in the set of cells 'U' (i.e., the cells in 'U' other than the subset of cells 'C'). In the example of FIG. 7A, these are the cells corresponding to base stations 702-2, 702-4, and 702-6, and in the example of FIG. 7B, these are the cells corresponding to base stations 702-3, 702-5, and 702-7. The computation entity then determines the set of inliers 1' in the set of cells 'U.' An inlier is a cell for which the observed ToA measurement matches the expected ToA for the cell (within some tolerance threshold 'T'). That is, since the UE has measured (and reported if it is not the location computation entity) the ToA of reference signals from each cell in the set of cells 'U,' the location computation entity can estimate what the ToA for a cell should be based on the UE's just-computed location estimate and the known location of the cell (i.e., the base station corresponding to the cell). It can then compare that expected ToA to the measured ToA, and if the difference is less than the tolerance threshold 'T,' the location computation entity can determine that the cell is an inlier.

With reference to FIG. 7A, the location computation entity has estimated the location of the UE using the cells corresponding to base stations 702-1, 702-3, 702-5, and 702-7. It then determines the expected ToAs for the cells corresponding to base stations 702-2, 702-4, and 702-6 using the calculated location of the UE and the known locations of base stations 702-2, 702-4, and 702-6. In the example of FIG. 7A, there is an FBS 710 imitating base station 702-2 (e.g., as an MITM, or at least by having the same PCI and/or CGI). As such, the measured ToA of reference signals from the FBS 710 will likely not be within the tolerance threshold 'T' of the expected ToA of reference signals from base station 702-2. However, the measured ToA of reference signals from the base stations 702-4 and 702-6 will likely be within the tolerance threshold 'T' of the expected ToAs for those base stations. As such, base stations 702-4 and 702-6 will likely be placed in the set of inliers 'L.'

With reference to FIG. 7B, the location computation entity estimates the location of the UE using the cells corresponding to base stations 702-1, 702-2, 702-4, and 702-6. It then determines the expected ToAs for the cells corresponding to base stations 702-3, 702-5, and 702-7 using the calculated location of the UE and the known locations of base stations 702-3, 702-5, and 702-7. In the example of FIG. 7B, because the location of the UE was estimated using the ToA of reference signals received from the FBS 710, the estimated location of the UE will likely be inaccurate (as illustrated by the shaded circle). As such, the measured ToAs of reference signals from one or more of base stations 702-3, 702-5, and 702-7 will likely not be within the tolerance threshold 'T' of the expected ToAs of reference signals from those base stations due to the inaccurate location estimate of the UE. Thus, it is possible that none of base stations 702-3, 702-5, and 702-7 will be placed in the set of inliers 'L.'

Third, the location computation entity iterates over 'M' different random choices of 'C' and picks the subset 'C' that maximizes the set of inliers (i.e., that results in the largest set or the most inliers). FIGS. 7A and 7B illustrate two iterations, for an 'M' of two. However, as will be appreciated, there may be more (or fewer) iterations than two. Because, as discussed above, the set of inliers 1' in the example of FIG. 7A will likely include base stations 702-4 and 702-6, but the set of inliers 1' in the example of FIG. 7B may not include any base stations, the location computation entity would likely select the subset of cells 'C' shown in FIG. 7A (i.e., the cells corresponding to base stations 702-1, 702-3, 702-5, and 702-7) as the subset of cells 'C' that maximizes the set of inliers 'L.'

Fourth, the location computation entity computes the final location estimate for the UE using the best subset 'C' (i.e., the subset 'C' that maximizes 1') and any inlier cells of the remaining cells in the set of cells 'U' (i.e., any inlier cells of the set of cells 'U' other than the subset of cells 'C'). The location computation entity then declares the non-inlier cells of the non-'C' cells as outliers. Thus, in the examples of FIGS. 7A and 7B, the location computation entity would calculate the location of the UE using the subset of cells 'C' shown in FIG. 7A (i.e., the cells corresponding to base stations 702-1, 702-3, 702-5, and 702-7) and the cells in the corresponding set of inliers (i.e., the cells corresponding to base stations 702-4 and 702-6). The location computation entity would then declare the base station 702-2 an outlier.

As discussed above, outliers can occur for various reasons, not just because of the presence of an FBS. However, by comparing the determined outliers for multiple UE's, a location server (e.g., location server 230, LMF 270, SLP 272) may be able to identify a single cell in common across the reports from the multiple UEs and declare that cell as an FBS with sufficient confidence.

Further, for DL-TDOA, the UE may report the quality of the ToA measurement (e.g., based on the observed SNR). While the quality metric may not always indicate whether a ToA measurement is reliable, a high-quality signal from an outlier common across multiple UEs could serve to reinforce the FBS detection hypothesis.

Note that the outlier detection may be performed at the UE and the results reported to the location server, or it may be performed at the location server based on measurements reported by the UE. Thus, the location computation entity may be either the UE or the location server.

In an aspect, the various techniques for detecting a potential FBS may be triggered for various reasons. For example, if the UE or the network is suspicious that there may be an FBS near the UE (e.g., based on reports from other UEs in the vicinity), the UE or the network may trigger an appropriate FBS detection technique and the corresponding positioning session (e.g., a DL-TDOA session, an RTT session, an E-CID session, etc.). As another example, the UE or the network may trigger a positioning session for the UE, and the UE or the network may take the opportunity to perform an appropriate FBS detection technique during it. As another example, an FBS technique may be triggered periodically as a precautionary measure.

Upon detecting a possible FBS (using one or more of the techniques described above), the UE may perform one or more mitigation operations. In some cases, the mitigation operation(s) may include reporting the suspected cell (and optionally the measurements that caused the UE to suspect the cell) to a server (e.g., a security server), de-prioritizing the suspect cell for cell selection/re-selection, and/or accessing the communication network using a different cell (if presently in communication with the suspect cell), frequency, band, or system. Note that the server (e.g., the security server) may be in the same communication network as the UE, FBS, and/or location server (i.e., belong to the same network operator), or it may be a crowdsourcing server that is not associated with the communication network, meaning it may be operated by a different network operator or service provider. In some cases, the server may be the same as or located at the location server.

The network side may also perform one or more mitigation operations upon detecting a possible FBS, either through its own detection measures or based on UE reports. In some cases, the mitigation operation(s) may include handing over the UE to a different cell or updating one or more communication parameters to de-prioritize the suspect cell for cell selection/re-selection at the UE. The network may also report the suspected cell to a server (e.g., a security server) in or out of the same communication network.

Figure 8:
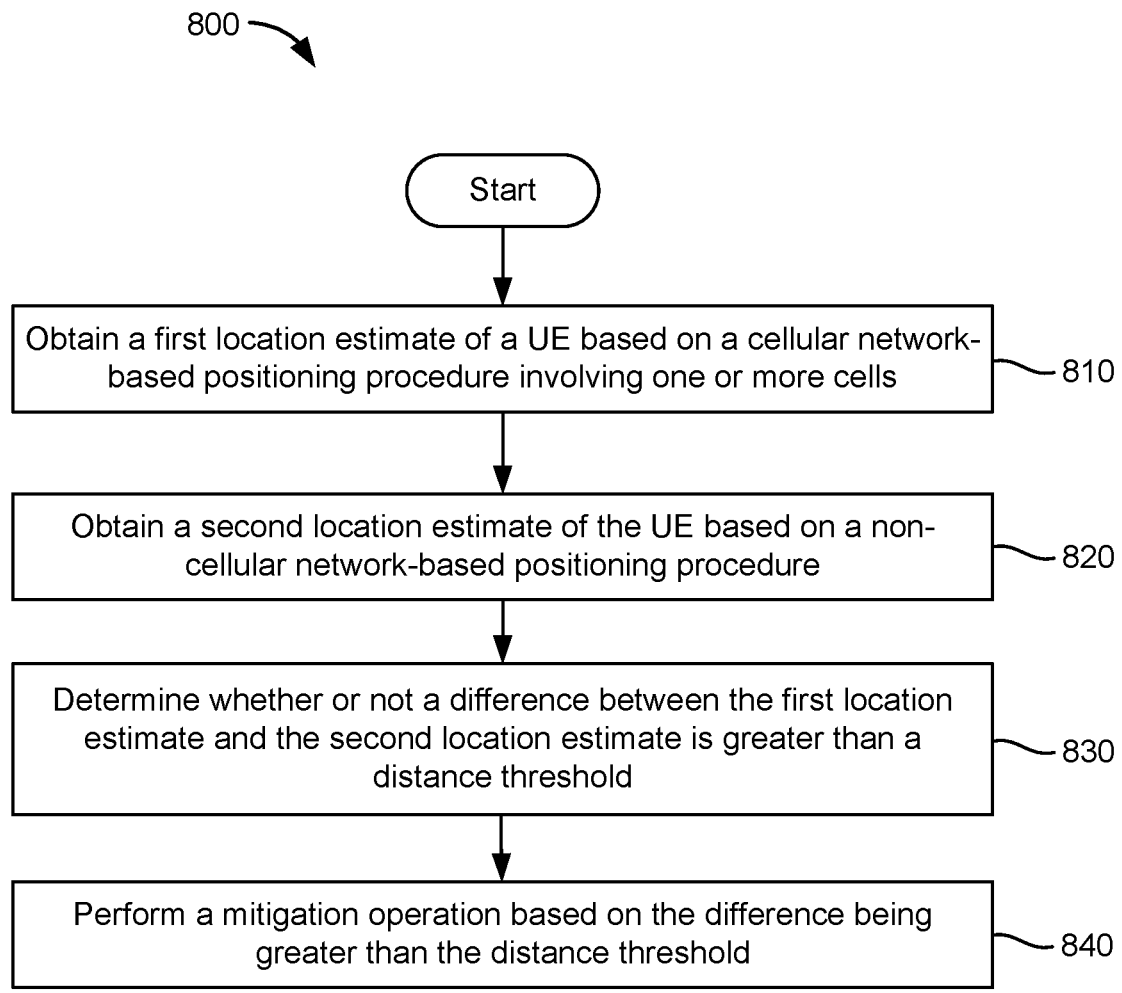
FIG. 8 illustrates an example method of FBS detection, according to aspects of the disclosure.

FIG. 8 illustrates an example method 800 for detecting a potential FBS, according to aspects of the disclosure. The method 800 may be performed by a UE (e.g., any of the UEs described herein) or a location server (e.g., location server 230, LMF 270, SLP 272).

At 810, the UE or the location server obtains a first location estimate of the UE based on a cellular network-based positioning procedure (e.g., a DL-TDOA procedure, an RTT procedure, an E-CID procedure, etc.) involving one or more cells. In an aspect, where a UE performs method 800, operation 810 may be performed by WWAN transceiver 310, processing system 332, memory component 340, and/or FBS detection component 342, any or all of which may be considered as means for performing this operation. In an aspect, where a location server performs method 800, operation 810 may be performed by network interface(s) 390, processing system 394, memory component 396, and/or FBS detection component 398, any or all of which may be considered as means for performing this operation.

At 820, the UE or location server obtains a second location estimate of the UE based on a non-cellular network-based positioning procedure (e.g., a satellite-based procedure, a WLAN-based procedure, a Bluetooth®-based procedure, etc.). In an aspect, where a UE performs method 800, operation 820 may be performed by WLAN transceiver 320, SPS receiver 330, processing system 332, memory component 340, sensor(s) 344, and/or FBS detection component 342, any or all of which may be considered as means for performing this operation. In an aspect, where a location server performs method 800, operation 820 may be performed by network interface(s) 390, processing system 394, memory component 396, and/or FBS detection component 398, any or all of which may be considered as means for performing this operation.

At 830, the UE or location server determines whether or not a difference between the first location estimate and the second location estimate is greater than a distance threshold. In an aspect, where a UE performs method 800, operation 830 may be performed by processing system 332, memory component 340, and/or FBS detection component 342, any or all of which may be considered as means for performing this operation. In an aspect, where a location server performs method 800, operation 830 may be performed by network interface(s) 390, processing system 394, memory component 396, and/or FBS detection component 398, any or all of which may be considered as means for performing this operation.

At 840, the UE or location server performs a mitigation operation based on the difference being greater than the distance threshold. In an aspect, where a UE performs method 800, operation 840 may be performed by WWAN transceiver 310, WLAN transceiver 320, processing system 332, memory component 340, and/or FBS detection component 342, any or all of which may be considered as means for performing this operation. In an aspect, where a location server performs method 800, operation 840 may be performed by network interface(s) 390, processing system 394, memory component 396, and/or FBS detection component 398, any or all of which may be considered as means for performing this operation.

Implementation examples are described in the following numbered clauses:

Clause 1. A method of detecting a potential false base station (FBS), comprising: obtaining a first location estimate of a user equipment (UE) based on a cellular network-based positioning procedure involving one or more cells; obtaining a second location estimate of the UE based on a non-cellular network-based positioning procedure; determining whether or not a difference between the first location estimate and the second location estimate is greater than a distance threshold; and performing a mitigation operation based on the difference being greater than the distance threshold.

Clause 2. The method of Clause 1, wherein the method is performed by the UE.

Clause 3. The method of Clause 2, further comprising: receiving positioning assistance information from a location server, the positioning assistance information including identifiers of the one or more cells.

Clause 4. The method of Clause 3, wherein the identifiers comprise one or more physical cell identifiers (PCIs), virtual cell identifiers (VCIs), or cell global identities (CGIs) of the one or more cells.

Clause 5. The method of any of Clauses 3 and 4, further comprising: obtaining an identifier of at least one cell that is not included in the positioning assistance information, wherein the UE obtains the first location estimate based on obtaining the identifier of the at least one cell that is not included in the positioning assistance information.

Clause 6. The method of Clause 5, further comprising: identifying the at least one cell as the potential FBS.

Clause 7. The method of Clause 2, further comprising: obtaining identifiers of the one or more cells from system information broadcasted by the one or more cells.

Clause 8. The method of Clause 7, wherein the system information comprises a system information block (SIB) and/or system information (SI) on a physical downlink control channel (PDCCH) and/or physical downlink shared channel (PDSCH).

Clause 9. The method of any of Clauses 2-8, wherein the mitigation operation comprises: transmitting, to a security server, a report indicating that the difference is greater than the distance threshold.

Clause 10. The method of Clause 9, wherein the report further includes identifiers of the one or more cells.

Clause 11. The method of any of Clauses 2-10, wherein the cellular network-based positioning procedure is performed with only one cell.

Clause 12. The method of Clause 11, wherein the mitigation operation comprises: updating one or more communication parameters to de-prioritize the one cell for cell selection and/or re-selection.

Clause 13. The method of any of Clauses 11 and 12, wherein the mitigation operation comprises: updating one or more communication parameters to access the communication network using a different cell, frequency, band, or system based on the UE currently being connected to the one cell.

Clause 14. The method of any of Clauses 11-13, wherein the cellular network-based positioning procedure comprises an enhanced cell identifier (E-CID) positioning procedure.

Clause 15. The method of any of Clauses 11-14, further comprising: identifying the one cell as the potential FBS.

Clause 16. The method of Clause 1, wherein the method is performed by a location server.

Clause 17. The method of Clause 16, wherein the cellular network-based positioning procedure is performed with only one cell.

Clause 18. The method of Clause 17, wherein the mitigation operation comprises: handing over the UE to a different cell based on the UE currently being in communication with the one cell.

Clause 19. The method of any of Clauses 17 and 18, wherein the mitigation operation comprises: updating one or more communication parameters of the UE to de-prioritize the one cell for cell selection/re-selection by the UE.

Clause 20. The method of any of Clauses 17-19, wherein the cellular network-based positioning procedure comprises an enhanced cell identifier (E-CID) positioning procedure.

Clause 21. The method of any of Clauses 17-20, further comprising: identifying the at least one cell as the potential FBS.

Clause 22. The method of any of Clauses 16-21, further comprising: obtaining a plurality of first location estimates, including the first location estimate, of a corresponding plurality of UEs, including the UE, based on a corresponding plurality of cellular network-based positioning procedures performed by the plurality of UEs; obtaining a plurality of second location estimates, including the second location estimate, of the plurality of UEs based on a plurality of non-cellular network-based positioning procedures performed by the plurality of UEs, wherein a difference between each of the plurality of first location estimates and the corresponding plurality of second location estimates is greater than the distance threshold; and identifying at least one cell in common across the plurality of cellular network-based positioning procedures.

Clause 23. The method of Clause 22, wherein the mitigation operation comprises: handing over the UE to a different cell based on the UE currently being in communication with the at least one cell.

Clause 24. The method of any of Clauses 22 and 23, wherein the mitigation operation comprises: updating one or more communication parameters of the UE to de-prioritize the at least one cell for cell selection/re-selection by the UE.

Clause 25. The method of any of Clauses 22-24, wherein the cellular network-based positioning procedure comprises an observed time difference of arrival (OTDOA) positioning procedure or a round-trip-time (RTT) positioning procedure.

Clause 26. The method of any of Clauses 16-25, wherein obtaining the first location estimate comprises: receiving, from the UE, positioning measurements of the one or more cells; and calculating the first location estimate of the UE based on the positioning measurements and locations of the one or more cells.

Clause 27. The method of any of Clauses 16-25, wherein obtaining the first location estimate comprises: receiving the first location estimate from the UE.

Clause 28. The method of any of Clauses 16-27, wherein obtaining the second location estimate comprises: receiving, from the UE, positioning measurements for the non-cellular network-based positioning procedure; and calculating the second location estimate based on the positioning measurements.

Clause 29. The method of any of Clauses 16-27, wherein obtaining the second location estimate comprises: receiving the second location estimate from the UE.

Clause 30. The method of any of Clauses 1-29, wherein the cellular network-based positioning procedure comprises a fifth generation (5G) New Radio (NR) positioning procedure.

Clause 31. The method of any of Clauses 1-30, wherein the non-cellular network-based positioning procedure comprises a wireless local area network (WLAN) based positioning procedure, a global navigation satellite system (GNSS) positioning procedure, or a Bluetooth® based positioning procedure.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. An apparatus for detecting a potential false base station (FBS), comprising:
    a memory;
    a communication unit; and
    at least one processor communicatively coupled to the memory and the communication unit, the at least one processor configured to:
        obtain at least a first latitude and a first longitude of a first location estimate of a user equipment (UE) based on a first type of wireless technology-based positioning procedure involving one or more cells;
        obtain at least a second latitude and a second longitude of a second location estimate of the UE based on a second type of wireless technology-based positioning procedure;
        determine whether or not a difference between at least the first latitude and the first longitude of the first location estimate and at least the second latitude and the second longitude of the second location estimate is greater than a distance threshold; and perform a mitigation operation based on the difference being greater than the distance threshold.

2. The apparatus of claim 1, wherein the apparatus is the UE.

3. The apparatus of claim 2, wherein the at least one processor is further configured to:

receive, via the communication device, positioning assistance information from a location server, the positioning assistance information including identifiers of the one or more cells.

4. The apparatus of claim 3, wherein the at least one processor is further configured to:

obtain an identifier of at least one cell that is not included in the positioning assistance information, wherein the at least one processor is configured to obtain the first location estimate based on the identifier of the at least one cell that is not included in the positioning assistance information.

5. The apparatus of claim 4, wherein the at least one processor is further configured to:

identify the at least one cell as the potential FBS.

6. The apparatus of claim 2, wherein the at least one processor is further configured to:

obtain identifiers of the one or more cells from system information broadcasted by the one or more cells.

7. The apparatus of claim 6, wherein the system information comprises a system information block (SIB), system information (SI) on a physical downlink control channel (PDCCH), physical downlink shared channel (PDSCH), or any combination thereof.

8. The apparatus of claim 2, wherein the at least one processor being configured to perform the mitigation operation comprises the at least one processor being configured to:

cause the communication unit to transmit, to a server, a report indicating that the difference is greater than the distance threshold.

9. The apparatus of claim 8, wherein the report further includes identifiers of the one or more cells.

10. The apparatus of claim 2, wherein the first type of wireless technology-based positioning procedure is performed with only one cell.

11. The apparatus of claim 10, wherein the at least one processor being configured to perform the mitigation operation comprises the at least one processor being configured to:

update one or more communication parameters to de-prioritize the one cell for cell selection and/or re-selection.

12. The apparatus of claim 10, wherein the at least one processor being configured to perform the mitigation operation comprises the at least one processor being configured to:

update one or more communication parameters to access the cellular network using a different cell, frequency, band, or system based on the UE currently being connected to the one cell.

13. The apparatus of claim 10, wherein the at least one processor is further configured to:

identify the one cell as the potential FBS.

14. The apparatus of claim 1, wherein the apparatus is a location server.

15. The apparatus of claim 14, wherein the first type of wireless technology-based positioning procedure is performed with only one cell.

16. The apparatus of claim 15, wherein the at least one processor being configured to perform the mitigation operation comprises the at least one processor being configured to:

hand over the UE to a different cell based on the UE currently being in communication with the one cell.

17. The apparatus of claim 15, wherein the at least one processor being configured to perform the mitigation operation comprises the at least one processor being configured to:

update one or more communication parameters of the UE to de-prioritize the one cell for cell selection/re-selection by the UE.

18. The apparatus of claim 15, wherein the at least one processor is further configured to:

identify the one cell as the potential FBS.

19. The apparatus of claim 14, wherein the at least one processor is further configured to:

obtain a plurality of first location estimates, including the first location estimate, of a corresponding plurality of UEs, including the UE, based on a corresponding plurality of the first type of wireless technology-based positioning procedures performed by the plurality of UEs;

obtain a plurality of second location estimates, including the second location estimate, of the plurality of UEs based on a plurality of the second type of wireless technology-based positioning procedures performed by the plurality of UEs, wherein a difference between each of the plurality of first location estimates and the corresponding plurality of second location estimates is greater than the distance threshold; and identify at least one cell in common across the plurality of the first type of wireless technology-based positioning procedures.

20. The apparatus of claim 19, wherein the at least one processor being configured to perform the mitigation operation comprises the at least one processor being configured to:

hand over one or more of the UEs to a different cell based on the one or more UEs currently being in communication with the at least one cell.

21. The apparatus of claim 19, wherein the at least one processor being configured to perform the mitigation operation comprises the at least one processor being configured to:

update one or more communication parameters of the UE to de-prioritize the at least one cell for cell selection/re-selection by the one or more UEs.

22. The apparatus of claim 14, wherein the at least one processor being configured to obtain the first location estimate comprises the at least one processor being configured to:

calculate the first location estimate based on positioning measurements of the one or more cells received from the UE and locations of the one or more cells, or receive the first location estimate from the UE.

23. The apparatus of claim 14, wherein the at least one processor being configured to obtain the second location estimate comprises the at least one processor being configured to:

calculate the second location estimate based on positioning measurements for the second type of wireless technology-based positioning procedure received from the UE, or receive the second location estimate from the UE.

24. The apparatus of claim 1, wherein:
the first type of wireless technology-based positioning procedure comprises a fifth generation (5G) New Radio (NR) positioning procedure, and
the second type of wireless technology-based positioning procedure comprises a wireless local area network (WLAN) based positioning procedure, a global navigation satellite system (GNSS) positioning procedure, or a Bluetooth® based positioning procedure.

25. A method of detecting a potential false base station (FBS), comprising:
obtaining at least a first latitude and a first longitude of a first location estimate of a user equipment (UE) based on a first type of wireless technology-based positioning procedure involving one or more cells;
obtaining at least a second latitude and a second longitude of a second location estimate of the UE based on a second type of wireless technology-based positioning procedure;
determining whether or not a difference between at least the first latitude and the first longitude of the first location estimate and at least the second latitude and the second longitude of the second location estimate is greater than a distance threshold; and
performing a mitigation operation based on the difference being greater than the distance threshold.

26. The method of claim 25, wherein:
the method is performed by the UE, and
the method further comprises:
receiving positioning assistance information from a location server, the positioning assistance information including identifiers of the one or more cells;
obtaining an identifier of at least one cell that is not included in the positioning assistance information, wherein the UE obtains the first location estimate based on obtaining the identifier of the at least one cell that is not included in the positioning assistance information; and
identifying the at least one cell as the potential FBS.

27. The method of claim 25, wherein:
the method is performed by a location server, and
the method further comprises:
obtaining a plurality of first location estimates, including the first location estimate, of a corresponding plurality of UEs, including the UE, based on a corresponding plurality of the first type of wireless technology-based positioning procedures performed by the plurality of UEs;
obtaining a plurality of second location estimates, including the second location estimate, of the plurality of UEs based on a plurality of the second type of wireless technology-based positioning procedures performed by the plurality of UEs, wherein a difference between each of the plurality of first location estimates and the corresponding plurality of second location estimates is greater than the distance threshold; and
identifying at least one cell in common across the plurality of the first type of wireless technology-based positioning procedures.

28. The method of claim 27, wherein the mitigation operation comprises:
handing over the UE to a different cell based on the UE currently being in communication with the at least one cell; or
updating one or more communication parameters of the UE to de-prioritize the at least one cell for cell selection/re-selection by the UE.

29. An apparatus for detecting a potential false base station (FBS), comprising:
means for obtaining at least a first latitude and a first longitude of a first location estimate of a user equipment (UE) based on a first type of wireless technology-based positioning procedure involving one or more cells;
means for obtaining at least a second latitude and a second longitude of a second location estimate of the UE based on a second type of wireless technology-based positioning procedure;
means for determining whether or not a difference between at least the first latitude and the first longitude of the first location estimate and at least the second latitude and the second longitude of the second location estimate is greater than a distance threshold; and
means for performing a mitigation operation based on the difference being greater than the distance threshold.

30. A non-transitory computer-readable medium storing computer-executable instructions for detecting a potential false base station (FBS) that, when executed by an apparatus, cause the apparatus to:
obtain at least a first latitude and a first longitude of a first location estimate of a user equipment (UE) based on a first type of wireless technology-based positioning procedure involving one or more cells;
obtain at least a second latitude and a second longitude of a second location estimate of the UE based on a second type of wireless technology-based positioning procedure;
determine whether or not a difference between at least the first latitude and the first longitude of the first location estimate and at least the second latitude and the second longitude of the second location estimate is greater than a distance threshold; and
perform a mitigation operation based on the difference being greater than the distance threshold.

* * * * *